(12) United States Patent
Sikka et al.

(10) Patent No.: US 9,139,744 B2
(45) Date of Patent: Sep. 22, 2015

(54) COMPOSITION AND COATING FOR HYDROPHOBIC PERFORMANCE

(71) Applicant: Ross Technology Corporation, Leola, PA (US)

(72) Inventors: Vinod K. Sikka, Oak Ridge, TN (US); Michael Hurley, Lancaster, PA (US); Zenas W. Lim, Lancaster, PA (US)

(73) Assignee: Ross Technology Corporation, Leola, PA (US)

( * ) Notice: Subject to any disclaimer, the term of this patent is extended or adjusted under 35 U.S.C. 154(b) by 0 days.

(21) Appl. No.: 14/305,425

(22) Filed: Jun. 16, 2014

(65) Prior Publication Data

US 2014/0296409 A1    Oct. 2, 2014

Related U.S. Application Data

(63) Continuation of application No. PCT/US2012/070200, filed on Dec. 17, 2012.

(60) Provisional application No. 61/583,178, filed on Jan. 4, 2012, provisional application No. 61/570,988, filed on Dec. 15, 2011.

(51) Int. Cl.
| | |
|---|---|
| *C09D 133/10* | (2006.01) |
| *C09D 7/12* | (2006.01) |
| *B05D 1/06* | (2006.01) |
| *C09D 5/02* | (2006.01) |
| *C09D 5/16* | (2006.01) |
| *C08K 5/07* | (2006.01) |
| *C08K 5/10* | (2006.01) |
| *C08K 9/06* | (2006.01) |

(52) U.S. Cl.
CPC ............ *C09D 7/1233* (2013.01); *B05D 1/06* (2013.01); *C09D 5/021* (2013.01); *C09D 5/1618* (2013.01); *C09D 7/1225* (2013.01); *C09D 7/1266* (2013.01); *C08K 5/07* (2013.01); *C08K 5/10* (2013.01); *C08K 9/06* (2013.01); *C09D 133/10* (2013.01)

(58) Field of Classification Search
None
See application file for complete search history.

(56) References Cited

U.S. PATENT DOCUMENTS

| 870,439 | A | 11/1907 | Kade |
|---|---|---|---|
| 2,191,701 | A | 2/1940 | Wood |
| 2,976,386 | A | 3/1961 | Salton |
| 3,185,426 | A | 5/1965 | Bjerke |
| 3,244,541 | A | 4/1966 | Fain et al. |
| 3,354,022 | A | 11/1967 | Dethe et al. |
| 3,579,540 | A | 5/1971 | Ohlhausen |
| 3,716,502 | A | 2/1973 | Loew |
| 3,931,428 | A | 1/1976 | Reick |
| 3,963,349 | A | 6/1976 | Albright et al. |
| 3,967,030 | A | 6/1976 | Johnson et al. |
| 3,975,197 | A | 8/1976 | Mikelsons |
| 3,976,572 | A | 8/1976 | Reick |
| 3,980,153 | A | 9/1976 | Andrews |
| 4,142,724 | A | 3/1979 | Reick |
| 4,151,327 | A | 4/1979 | Lawton |
| 4,199,142 | A | 4/1980 | Reick |
| 4,301,197 | A | 11/1981 | Franz et al. |
| 4,301,213 | A | 11/1981 | Davies |
| 4,311,755 | A | 1/1982 | Rummel |
| 4,415,405 | A | 11/1983 | Ruddle et al. |
| 4,451,619 | A | 5/1984 | Heilmann et al. |
| 4,453,533 | A | 6/1984 | Scheidler et al. |
| 4,474,852 | A | 10/1984 | Craig |
| 4,492,217 | A | 1/1985 | Scheidler |
| 4,581,149 | A | 4/1986 | Horodysky et al. |
| 4,591,530 | A | 5/1986 | Lui |
| 4,614,464 | A | 9/1986 | Christensen |
| 4,624,900 | A | 11/1986 | Fau |
| 4,646,948 | A | 3/1987 | Jennings |
| 4,680,173 | A | 7/1987 | Burger |
| 4,687,707 | A | 8/1987 | Matsuo et al. |
| 4,716,183 | A | 12/1987 | Gamarra et al. |
| 4,733,843 | A | 3/1988 | Bessinger |
| 4,738,426 | A | 4/1988 | Bessinger |
| D295,950 | S | 5/1988 | Johnston |
| 4,749,110 | A | 6/1988 | Maeno et al. |
| 4,753,977 | A | 6/1988 | Merrill |
| 4,782,112 | A | 11/1988 | Kondo et al. |
| 4,835,014 | A | 5/1989 | Roth et al. |
| 4,855,176 | A | 8/1989 | Ohwaki et al. |
| 4,870,907 | A | 10/1989 | McKee |
| 4,923,260 | A | 5/1990 | Poulsen |
| 4,971,912 | A | 11/1990 | Buhl et al. |
| 4,983,459 | A | 1/1991 | Franz et al. |
| 5,011,727 | A | 4/1991 | Kido et al. |
| 5,011,963 | A | 4/1991 | Ogawa et al. |
| 5,032,641 | A | 7/1991 | Nanishi et al. |
| 5,041,304 | A | 8/1991 | Kusano et al. |

(Continued)

FOREIGN PATENT DOCUMENTS

| CA | 2175848 A1 | 12/1996 |
|---|---|---|
| DE | 10 2010 022 265 A | 5/2010 |

(Continued)

OTHER PUBLICATIONS

International Search Report and Written Opinion, International Application No. PCT/US2010/070200 (published as WO 2013/090939 A1), Feb. 27, 2013.

(Continued)

*Primary Examiner* — Marc Zimmer
(74) *Attorney, Agent, or Firm* — Perkins Coie LLP (57) ABSTRACT

The present disclosure describes compositions comprising an acrylic polymer binder and nano-particles less than about 100 nm that provide a hydrophobic or superhydrophobic coating that may also display oleophobicity. The coating composition may advantageously be prepared using VOC exempt compounds that are compatible with a variety of surface materials including many electronic components. In addition, the coating composition may also be rapidly dried rendering it useful for the rapid preparation of coated objects and surfaces in manufacturing/assembly line environments.

22 Claims, 1 Drawing Sheet

(56) References Cited

U.S. PATENT DOCUMENTS

| | | |
|---|---|---|
| 5,057,050 A | 10/1991 | Hill |
| 5,084,191 A | 1/1992 | Nagase et al. |
| 5,104,938 A | 4/1992 | Toyama et al. |
| 5,121,134 A | 6/1992 | Albinson et al. |
| 5,156,611 A | 10/1992 | Haynes et al. |
| 5,202,361 A | 4/1993 | Zimmerman et al. |
| 5,212,215 A | 5/1993 | Nanri et al. |
| 5,225,274 A | 7/1993 | Ogawa et al. |
| 5,228,764 A | 7/1993 | Cherry et al. |
| 5,228,905 A | 7/1993 | Grunewalder et al. |
| 5,238,746 A | 8/1993 | Soga et al. |
| 5,240,774 A | 8/1993 | Ogawa et al. |
| 5,274,159 A | 12/1993 | Pellerite et al. |
| 5,284,707 A | 2/1994 | Ogawa et al. |
| 5,294,252 A | 3/1994 | Gun |
| 5,300,239 A | 4/1994 | Ozaki et al. |
| 5,308,705 A | 5/1994 | Franz et al. |
| 5,312,573 A | 5/1994 | Rosenbaum et al. |
| 5,316,799 A | 5/1994 | Brunken et al. |
| 5,317,129 A | 5/1994 | Taplan et al. |
| 5,324,566 A | 6/1994 | Ogawa et al. |
| 5,328,768 A | 7/1994 | Goodwin |
| 5,338,345 A | 8/1994 | Scarborough et al. |
| 5,348,547 A | 9/1994 | Payne et al. |
| 5,352,733 A | 10/1994 | Hart |
| 5,362,145 A | 11/1994 | Bird et al. |
| 5,364,299 A | 11/1994 | Hill et al. |
| 5,366,810 A | 11/1994 | Merrifield et al. |
| 5,368,892 A | 11/1994 | Berquier |
| 5,372,888 A | 12/1994 | Ogawa et al. |
| 5,380,585 A | 1/1995 | Ogawa et al. |
| 5,385,966 A | 1/1995 | Hermansen et al. |
| 5,395,657 A | 3/1995 | Strepparola et al. |
| 5,424,130 A | 6/1995 | Nakanishi et al. |
| 5,429,433 A | 7/1995 | Bird et al. |
| 5,435,839 A | 7/1995 | Ogawa |
| 5,437,894 A | 8/1995 | Ogawa et al. |
| 5,437,900 A | 8/1995 | Kuzowski |
| 5,441,338 A | 8/1995 | Kane et al. |
| 5,458,976 A | 10/1995 | Horino et al. |
| 5,466,770 A | 11/1995 | Audenaert et al. |
| 5,489,328 A | 2/1996 | Ono et al. |
| 5,500,216 A | 3/1996 | Julian et al. |
| 5,540,493 A | 7/1996 | Kane et al. |
| 5,556,667 A | 9/1996 | Teranishi et al. |
| 5,558,940 A | 9/1996 | Michels et al. |
| 5,564,809 A | 10/1996 | Kane et al. |
| 5,576,096 A | 11/1996 | Ono et al. |
| 5,578,361 A | 11/1996 | Tsujioka et al. |
| 5,584,957 A | 12/1996 | Schultheis et al. |
| 5,585,896 A | 12/1996 | Yamazaki et al. |
| 5,599,893 A | 2/1997 | Asai et al. |
| 5,612,433 A | 3/1997 | Ono et al. |
| 5,618,627 A | 4/1997 | Merrifield et al. |
| 5,651,921 A | 7/1997 | Kaijou |
| 5,658,969 A | 8/1997 | Gerace |
| 5,674,967 A | 10/1997 | Goodwin |
| 5,679,460 A | 10/1997 | Schakenraad et al. |
| 5,688,864 A | 11/1997 | Goodwin |
| 5,697,991 A | 12/1997 | Frazer |
| 5,707,740 A | 1/1998 | Goodwin |
| 5,725,789 A | 3/1998 | Huber et al. |
| 5,735,589 A | 4/1998 | Herrmann et al. |
| 5,747,561 A | 5/1998 | Smirnov et al. |
| 5,753,734 A | 5/1998 | Maruyama |
| 5,798,144 A | 8/1998 | Varansai et al. |
| 5,800,918 A | 9/1998 | Chartier et al. |
| 5,813,741 A | 9/1998 | Fish et al. |
| 5,814,411 A | 9/1998 | Merrifield et al. |
| 5,824,421 A | 10/1998 | Kobayashi et al. |
| 5,830,529 A | 11/1998 | Ross |
| 5,840,201 A | 11/1998 | Elledge |
| 5,843,338 A | 12/1998 | Inoue et al. |
| 5,853,690 A | 12/1998 | Hibino et al. |
| 5,853,800 A | 12/1998 | Dombrowski et al. |
| 5,856,378 A | 1/1999 | Ring et al. |
| 5,858,551 A | 1/1999 | Salsman |
| 5,876,806 A | 3/1999 | Ogawa |
| 5,890,907 A | 4/1999 | Minasian |
| 5,910,557 A | 6/1999 | Audenaert et al. |
| 5,921,411 A | 7/1999 | Merl |
| 5,924,359 A | 7/1999 | Watanabe |
| 5,945,482 A | 8/1999 | Fukuchi et al. |
| 5,947,574 A | 9/1999 | Avendano |
| 5,948,685 A | 9/1999 | Angros |
| 5,952,053 A | 9/1999 | Colby |
| 5,958,601 A | 9/1999 | Salsman |
| 5,980,990 A | 11/1999 | Goodwin |
| 6,013,724 A | 1/2000 | Mizutani et al. |
| 6,017,609 A | 1/2000 | Akamatsu et al. |
| 6,017,831 A | 1/2000 | Beardsley et al. |
| 6,017,997 A | 1/2000 | Snow et al. |
| 6,024,948 A | 2/2000 | Samain et al. |
| 6,025,025 A | 2/2000 | Bartrug et al. |
| 6,033,738 A | 3/2000 | Teranishi et al. |
| 6,045,650 A | 4/2000 | Mitchnick et al. |
| 6,068,911 A | 5/2000 | Shouji et al. |
| 6,090,447 A | 7/2000 | Suzuki et al. |
| 6,093,559 A | 7/2000 | Bookbinder et al. |
| 6,096,380 A | 8/2000 | Takebe et al. |
| 6,105,233 A | 8/2000 | Neal |
| 6,114,446 A | 9/2000 | Narisawa et al. |
| 6,117,555 A | 9/2000 | Fujimori et al. |
| 6,119,626 A | 9/2000 | Miyazawa et al. |
| 6,120,720 A | 9/2000 | Meier et al. |
| 6,136,210 A | 10/2000 | Biegelsen et al. |
| 6,153,304 A | 11/2000 | Smith et al. |
| 6,187,143 B1 | 2/2001 | Juppo et al. |
| 6,191,122 B1 | 2/2001 | Lux et al. |
| 6,201,058 B1 | 3/2001 | Mahr et al. |
| 6,207,236 B1 | 3/2001 | Araki et al. |
| 6,221,434 B1 | 4/2001 | Visca et al. |
| 6,224,974 B1 | 5/2001 | Wuu |
| 6,228,435 B1 | 5/2001 | Yoshikawa et al. |
| 6,228,972 B1 | 5/2001 | Hikita et al. |
| 6,235,383 B1 | 5/2001 | Hong et al. |
| 6,235,833 B1 | 5/2001 | Akamatsu et al. |
| 6,245,387 B1 | 6/2001 | Hayden |
| 6,264,751 B1 | 7/2001 | Kamura et al. |
| 6,280,834 B1 | 8/2001 | Veerasamy et al. |
| 6,288,149 B1 | 9/2001 | Kroll |
| 6,291,054 B1 | 9/2001 | Thomas et al. |
| 6,333,074 B1 | 12/2001 | Ogawa et al. |
| 6,333,558 B1 | 12/2001 | Hasegawa |
| 6,337,133 B1 | 1/2002 | Akamatsu et al. |
| 6,340,502 B1 | 1/2002 | Azzopardi et al. |
| 6,342,268 B1 | 1/2002 | Samain |
| 6,352,758 B1 | 3/2002 | Huang et al. |
| 6,358,569 B1 | 3/2002 | Badyal et al. |
| 6,361,868 B1 | 3/2002 | Bier et al. |
| 6,376,592 B1 | 4/2002 | Shimada et al. |
| 6,379,751 B1 | 4/2002 | Schafer et al. |
| 6,383,642 B1 | 5/2002 | Le Bellac et al. |
| 6,403,397 B1 | 6/2002 | Katz |
| 6,419,985 B1 | 7/2002 | Ishizuka |
| 6,423,372 B1 | 7/2002 | Genzer et al. |
| 6,423,381 B1 | 7/2002 | Colton et al. |
| 6,432,181 B1 | 8/2002 | Ludwig |
| 6,451,432 B1 | 9/2002 | Azzopardi et al. |
| 6,451,876 B1 | 9/2002 | Koshy |
| 6,458,420 B1 | 10/2002 | Akamatsu et al. |
| 6,461,537 B1 | 10/2002 | Turcotte et al. |
| 6,461,670 B2 | 10/2002 | Akamatsu et al. |
| 6,462,115 B1 | 10/2002 | Takahashi et al. |
| 6,471,761 B2 | 10/2002 | Fan et al. |
| 6,476,095 B2 | 11/2002 | Simendinger, III |
| 6,479,612 B1 | 11/2002 | Del Pesco et al. |
| 6,482,524 B1 | 11/2002 | Yamamoto et al. |
| 6,488,347 B1 | 12/2002 | Bienick |
| 6,564,935 B1 | 5/2003 | Yamamoto et al. |
| 6,579,620 B2 | 6/2003 | Mizuno et al. |
| 6,582,825 B2 | 6/2003 | Amarasekera et al. |
| 6,584,744 B1 | 7/2003 | Schultheis et al. |
| 6,596,060 B1 | 7/2003 | Michaud |

(56) References Cited

U.S. PATENT DOCUMENTS

| | | |
|---|---|---|
| 6,610,363 B2 | 8/2003 | Arora et al. |
| 6,613,860 B1 | 9/2003 | Dams et al. |
| 6,623,863 B2 | 9/2003 | Kamitani et al. |
| 6,641,654 B2 | 11/2003 | Akamatsu et al. |
| 6,649,222 B1 | 11/2003 | D'Agostino et al. |
| 6,652,640 B2 | 11/2003 | Asai et al. |
| 6,660,339 B1 | 12/2003 | Datta et al. |
| 6,660,363 B1 | 12/2003 | Barthlott |
| 6,660,686 B2 | 12/2003 | Inagaki et al. |
| 6,683,126 B2 | 1/2004 | Keller et al. |
| 6,685,992 B1 | 2/2004 | Ogawa et al. |
| 6,689,200 B2 | 2/2004 | Scarborough et al. |
| 6,692,565 B2 | 2/2004 | Johansen, Jr. et al. |
| 6,706,798 B2 | 3/2004 | Kobayashi et al. |
| 6,720,371 B2 | 4/2004 | Furuta et al. |
| 6,729,704 B2 | 5/2004 | Ames |
| 6,743,467 B1 | 6/2004 | Jones et al. |
| 6,767,984 B2 | 7/2004 | Toui et al. |
| 6,770,323 B2 | 8/2004 | Genzer et al. |
| 6,780,497 B1 | 8/2004 | Walter |
| 6,786,562 B2 | 9/2004 | Obrock et al. |
| 6,793,821 B2 | 9/2004 | Lee et al. |
| 6,800,354 B2 | 10/2004 | Baumann et al. |
| 6,806,299 B2 | 10/2004 | Baumann et al. |
| 6,808,835 B2 | 10/2004 | Green et al. |
| 6,811,716 B1 | 11/2004 | Stengaard et al. |
| 6,811,844 B2 | 11/2004 | Trouilhet |
| 6,811,884 B2 | 11/2004 | Goodwin et al. |
| 6,845,788 B2 | 1/2005 | Extrand |
| 6,852,389 B2 | 2/2005 | Nun et al. |
| 6,852,390 B2 | 2/2005 | Extrand |
| 6,855,375 B2 | 2/2005 | Nakagawa et al. |
| 6,855,759 B2 | 2/2005 | Kudo et al. |
| 6,858,284 B2 | 2/2005 | Nun et al. |
| 6,871,923 B2 | 3/2005 | Dietz et al. |
| 6,872,441 B2 | 3/2005 | Baumann et al. |
| 6,884,904 B2 | 4/2005 | Smith et al. |
| 6,890,360 B2 | 5/2005 | Cote et al. |
| 6,923,216 B2 | 8/2005 | Extrand et al. |
| 6,926,946 B2 | 8/2005 | Ogawa et al. |
| 6,931,888 B2 | 8/2005 | Shekunov et al. |
| 6,938,774 B2 | 9/2005 | Extrand |
| 6,942,746 B2 | 9/2005 | Niejelow et al. |
| 6,966,990 B2 | 11/2005 | Chattopadhyay et al. |
| 6,976,585 B2 | 12/2005 | Extrand |
| 6,976,998 B2 | 12/2005 | Rizzo et al. |
| 6,982,242 B2 | 1/2006 | Liss et al. |
| 6,992,858 B2 | 1/2006 | Kaneko |
| 6,994,033 B2 | 2/2006 | Kweon |
| 6,994,045 B2 | 2/2006 | Paszkowski |
| 6,998,051 B2 | 2/2006 | Chattopadhyay et al. |
| 7,004,184 B2 | 2/2006 | Handique et al. |
| 7,005,372 B2 | 2/2006 | Levy et al. |
| 7,019,069 B2 | 3/2006 | Kobayashi et al. |
| 7,022,416 B2 | 4/2006 | Teranishi |
| 7,026,018 B2 | 4/2006 | Kranovich |
| 7,037,591 B2 | 5/2006 | Henze et al. |
| 7,048,889 B2 | 5/2006 | Arney et al. |
| 7,052,244 B2 | 5/2006 | Fouillet et al. |
| 7,056,409 B2 | 6/2006 | Dubrow |
| 7,057,832 B2 | 6/2006 | Wu et al. |
| 7,057,881 B2 | 6/2006 | Chow et al. |
| 7,074,273 B2 | 7/2006 | Shimomura et al. |
| 7,074,294 B2 | 7/2006 | Dubrow |
| 7,083,748 B2 | 8/2006 | Chattopadhyay et al. |
| 7,083,828 B2 | 8/2006 | Muller et al. |
| 7,109,256 B2 | 9/2006 | Amano et al. |
| 7,112,369 B2 | 9/2006 | Wang et al. |
| 7,141,276 B2 | 11/2006 | Lehmann et al. |
| 7,148,181 B2 | 12/2006 | Tanaka et al. |
| 7,150,904 B2 | 12/2006 | D'Urso et al. |
| 7,153,357 B2 | 12/2006 | Baumgart et al. |
| 7,157,018 B2 | 1/2007 | Scheidler |
| 7,166,235 B2 | 1/2007 | Majeti et al. |
| 7,175,723 B2 | 2/2007 | Jones et al. |
| 7,179,758 B2 | 2/2007 | Chakrapani et al. |
| 7,179,864 B2 | 2/2007 | Wang |
| 7,188,917 B2 | 3/2007 | Bienick |
| 7,198,855 B2 | 4/2007 | Liebmann-Vinson et al. |
| 7,204,298 B2 | 4/2007 | Hodes et al. |
| 7,211,223 B2 | 5/2007 | Fouillet et al. |
| 7,211,313 B2 | 5/2007 | Nun et al. |
| 7,211,329 B2 | 5/2007 | Metz et al. |
| 7,211,605 B2 | 5/2007 | Coronado et al. |
| 7,213,309 B2 | 5/2007 | Wang et al. |
| D547,640 S | 7/2007 | Remmers |
| 7,238,751 B2 | 7/2007 | Wang et al. |
| 7,253,130 B2 | 8/2007 | Chiang et al. |
| 7,258,731 B2 | 8/2007 | D'Urso et al. |
| 7,264,845 B2 | 9/2007 | Papadaki et al. |
| 7,265,468 B1 | 9/2007 | Mancl et al. |
| 7,268,179 B2 | 9/2007 | Brown |
| 7,273,658 B2 | 9/2007 | Benayoun et al. |
| 7,285,331 B1 | 10/2007 | Reihs et al. |
| 7,288,311 B2 | 10/2007 | Kawashima et al. |
| 7,288,592 B2 | 10/2007 | Stark et al. |
| 7,291,653 B2 | 11/2007 | Baumann et al. |
| 7,306,895 B2 | 12/2007 | Kano et al. |
| 7,309,278 B2 | 12/2007 | Shibata |
| 7,312,057 B2 | 12/2007 | Bookbinder et al. |
| 7,323,033 B2 | 1/2008 | Kroupenkine et al. |
| 7,338,835 B2 | 3/2008 | Bao |
| 7,342,551 B2 | 3/2008 | King |
| 7,344,619 B2 | 3/2008 | Helmeke |
| 7,344,758 B2 | 3/2008 | Franchina et al. |
| 7,344,783 B2 | 3/2008 | Shea |
| 7,354,328 B2 | 4/2008 | Lee |
| 7,354,624 B2 | 4/2008 | Millero et al. |
| 7,354,650 B2 | 4/2008 | Nakajima et al. |
| D568,344 S | 5/2008 | Baacke et al. |
| 7,368,510 B2 | 5/2008 | Lee et al. |
| 7,393,515 B2 | 7/2008 | Hoshino et al. |
| 7,396,395 B1 | 7/2008 | Chen et al. |
| 7,419,615 B2 | 9/2008 | Strauss |
| 7,449,233 B2 | 11/2008 | Arora |
| 7,468,333 B2 | 12/2008 | Kimbrell, Jr. et al. |
| 7,497,533 B2 | 3/2009 | Remmers |
| 7,524,531 B2 | 4/2009 | Axtell, III et al. |
| 7,527,832 B2 | 5/2009 | Sakoske et al. |
| 7,544,411 B2 | 6/2009 | Baumann et al. |
| D596,931 S | 7/2009 | Fernandez |
| D596,932 S | 7/2009 | Kleinsasser |
| 7,563,505 B2 | 7/2009 | Reihs |
| 7,568,583 B2 | 8/2009 | Wing et al. |
| 7,607,744 B2 | 10/2009 | Casoli et al. |
| D607,020 S | 12/2009 | Baacke et al. |
| D612,404 S | 3/2010 | Picken et al. |
| D612,405 S | 3/2010 | Eicher |
| D613,316 S | 4/2010 | Schmidt |
| 7,726,615 B2 | 6/2010 | Rutz |
| 7,731,316 B2 | 6/2010 | Wing |
| 7,748,806 B2 | 7/2010 | Egan |
| 7,767,758 B2 | 8/2010 | Moorlag et al. |
| 7,901,731 B2 | 3/2011 | Russell et al. |
| 7,919,180 B2 | 4/2011 | Furukawa |
| 7,935,209 B2 | 5/2011 | Ward |
| 7,943,234 B2 | 5/2011 | Lawin et al. |
| 7,950,756 B2 | 5/2011 | Collins et al. |
| 7,989,619 B2 | 8/2011 | Guire et al. |
| 8,231,191 B2 | 7/2012 | Leconte et al. |
| 8,258,206 B2 * | 9/2012 | Kanagasabapathy et al. ............. 523/175 |
| 8,286,561 B2 | 10/2012 | Driver et al. |
| 8,513,342 B2 | 8/2013 | Gao et al. |
| 8,596,205 B2 | 12/2013 | Driver et al. |
| 8,899,704 B2 | 12/2014 | Bienick |
| 2001/0018130 A1 | 8/2001 | Hayden |
| 2001/0019773 A1 | 9/2001 | Akamatsu et al. |
| 2001/0024728 A1 | 9/2001 | Kamitani et al. |
| 2001/0030808 A1 | 10/2001 | Komatsu et al. |
| 2001/0055677 A1 | 12/2001 | Wuu |
| 2002/0001676 A1 | 1/2002 | Hayden |
| 2002/0034627 A1 | 3/2002 | Jacquiod et al. |
| 2002/0045007 A1 | 4/2002 | Arora et al. |

(56) References Cited

U.S. PATENT DOCUMENTS

| | | |
|---|---|---|
| 2002/0077412 A1 | 6/2002 | Kobayashi et al. |
| 2002/0111402 A1 | 8/2002 | Mizuno et al. |
| 2002/0115736 A1 | 8/2002 | Koshy |
| 2002/0177655 A1 | 11/2002 | Pratt et al. |
| 2002/0192472 A1 | 12/2002 | Metz et al. |
| 2002/0197490 A1 | 12/2002 | Amidaiji et al. |
| 2003/0009049 A1 | 1/2003 | Smith et al. |
| 2003/0021902 A1 | 1/2003 | Yamamoto et al. |
| 2003/0026972 A1 | 2/2003 | Reihs |
| 2003/0040243 A1 | 2/2003 | Ward |
| 2003/0040568 A1 | 2/2003 | Furuta et al. |
| 2003/0070677 A1 | 4/2003 | Handique et al. |
| 2003/0072723 A1 | 4/2003 | Gers-Barlag et al. |
| 2003/0073067 A1 | 4/2003 | Bookfinder et al. |
| 2003/0077533 A1 | 4/2003 | Murota et al. |
| 2003/0091809 A1 | 5/2003 | Scarborough et al. |
| 2003/0110976 A1 | 6/2003 | Abidh et al. |
| 2003/0117051 A1 | 6/2003 | Kweon |
| 2003/0119684 A1 | 6/2003 | Tsao |
| 2003/0125656 A1 | 7/2003 | Davankov et al. |
| 2003/0143339 A1 | 7/2003 | Kobayashi |
| 2003/0149218 A1 | 8/2003 | Cote' et al. |
| 2003/0166840 A1 | 9/2003 | Urry et al. |
| 2003/0170401 A1 | 9/2003 | Shimomura et al. |
| 2003/0176572 A1 | 9/2003 | Maekawa et al. |
| 2003/0179494 A1 | 9/2003 | Kaneko |
| 2004/0005469 A1 | 1/2004 | Metz et al. |
| 2004/0020104 A1 | 2/2004 | Feldhege et al. |
| 2004/0025747 A1 | 2/2004 | Kamitani et al. |
| 2004/0050297 A1 | 3/2004 | Kobayashi et al. |
| 2004/0053058 A1 | 3/2004 | Kamitani et al. |
| 2004/0056575 A1 | 3/2004 | Dietz et al. |
| 2004/0097616 A1 | 5/2004 | Hoppler et al. |
| 2004/0102124 A1 | 5/2004 | Suzuki |
| 2004/0121168 A1 | 6/2004 | Goodwin et al. |
| 2004/0137814 A1 | 7/2004 | Kimbrell, Jr. et al. |
| 2004/0138083 A1 | 7/2004 | Kimbrell, Jr. et al. |
| 2004/0142557 A1 | 7/2004 | Levy et al. |
| 2004/0154106 A1 | 8/2004 | Oles et al. |
| 2004/0201048 A1 | 10/2004 | Seki et al. |
| 2004/0202872 A1 | 10/2004 | Fang et al. |
| 2004/0209203 A1 | 10/2004 | Kano et al. |
| 2004/0213904 A1 | 10/2004 | Muller et al. |
| 2004/0216227 A1 | 11/2004 | Papadaki et al. |
| 2005/0000463 A1 | 1/2005 | Mochizuki |
| 2005/0004264 A1 | 1/2005 | Tanabe |
| 2005/0008859 A1 | 1/2005 | Forgacs |
| 2005/0009953 A1 | 1/2005 | Shea |
| 2005/0020763 A1 | 1/2005 | Milic |
| 2005/0022313 A1 | 2/2005 | Scheidler |
| 2005/0053793 A1 | 3/2005 | Benay-Oun et al. |
| 2005/0075020 A1 | 4/2005 | Benayoun et al. |
| 2005/0106762 A1 | 5/2005 | Chakrapani et al. |
| 2005/0121782 A1 | 6/2005 | Nakamura et al. |
| 2005/0143547 A1 | 6/2005 | Stark et al. |
| 2005/0165194 A1 | 7/2005 | Benayoun et al. |
| 2005/0170098 A1 | 8/2005 | Baumann et al. |
| 2005/0221098 A1 | 10/2005 | Azzopardi et al. |
| 2005/0239211 A1 | 10/2005 | Uchihara et al. |
| 2005/0245395 A1 | 11/2005 | Tanaka et al. |
| 2006/0013983 A1 | 1/2006 | Sebastian et al. |
| 2006/0029808 A1 | 2/2006 | Zhai et al. |
| 2006/0040164 A1 | 2/2006 | Vyas et al. |
| 2006/0051561 A1 | 3/2006 | Badyal |
| 2006/0052556 A1 | 3/2006 | Franchina et al. |
| 2006/0057390 A1 | 3/2006 | Kittle et al. |
| 2006/0058458 A1 | 3/2006 | Hasskerl et al. |
| 2006/0062695 A1 | 3/2006 | Haab et al. |
| 2006/0062929 A1 | 3/2006 | Kittle et al. |
| 2006/0081394 A1 | 4/2006 | Li et al. |
| 2006/0089466 A1 | 4/2006 | Shimomura et al. |
| 2006/0110541 A1 | 5/2006 | Russell et al. |
| 2006/0110542 A1 | 5/2006 | Dietz et al. |
| 2006/0113443 A1 | 6/2006 | Remmers |
| 2006/0147634 A1 | 7/2006 | Strauss |
| 2006/0151739 A1 | 7/2006 | Sandner et al. |
| 2006/0154048 A1 | 7/2006 | Teranishi et al. |
| 2006/0162373 A1 | 7/2006 | McMillin et al. |
| 2006/0172641 A1 | 8/2006 | Hennige et al. |
| 2006/0185555 A1 | 8/2006 | Giessler et al. |
| 2006/0207032 A1 | 9/2006 | Reiners et al. |
| 2006/0213849 A1 | 9/2006 | Bienick |
| 2006/0222865 A1 | 10/2006 | Hoshino et al. |
| 2006/0240218 A1 | 10/2006 | Parce |
| 2006/0263516 A1 | 11/2006 | Jones et al. |
| 2006/0266258 A1 | 11/2006 | Asakura et al. |
| 2006/0269758 A1 | 11/2006 | Helmeke |
| 2006/0281889 A1 | 12/2006 | Kobayashi et al. |
| 2006/0286305 A1 | 12/2006 | Thies et al. |
| 2006/0292345 A1 | 12/2006 | Dave et al. |
| 2007/0003705 A1 | 1/2007 | Strauss |
| 2007/0005024 A1 | 1/2007 | Weber et al. |
| 2007/0009657 A1 | 1/2007 | Zhang et al. |
| 2007/0014970 A1 | 1/2007 | Nun et al. |
| 2007/0026193 A1 | 2/2007 | Luzinov et al. |
| 2007/0036906 A1 | 2/2007 | Reeve |
| 2007/0046160 A1 | 3/2007 | Egan |
| 2007/0065668 A1 | 3/2007 | Idei |
| 2007/0075199 A1 | 4/2007 | Stewart et al. |
| 2007/0141114 A1 | 6/2007 | Muisener et al. |
| 2007/0141306 A1 | 6/2007 | Kasai et al. |
| 2007/0148407 A1 | 6/2007 | Chen et al. |
| 2007/0166513 A1 | 7/2007 | Sheng et al. |
| 2007/0172650 A1 | 7/2007 | O'Rear, III et al. |
| 2007/0172658 A1 | 7/2007 | Deruelle et al. |
| 2007/0172661 A1 | 7/2007 | Fechner et al. |
| 2007/0176379 A1 | 8/2007 | Sonnendorfer et al. |
| 2007/0196656 A1 | 8/2007 | Rowell |
| 2007/0202342 A1 | 8/2007 | Whiteford et al. |
| 2007/0213230 A1 | 9/2007 | Pfeiffer et al. |
| 2007/0215004 A1 | 9/2007 | Kuroda et al. |
| 2007/0218265 A1 | 9/2007 | Harris et al. |
| 2007/0224898 A1 | 9/2007 | Deangelis et al. |
| 2007/0231517 A1 | 10/2007 | Golownia |
| 2007/0238807 A1 | 10/2007 | Safir et al. |
| 2007/0259156 A1 | 11/2007 | Kempers et al. |
| 2007/0274871 A1 | 11/2007 | Jiang |
| 2007/0275245 A1 | 11/2007 | Persson et al. |
| 2007/0298216 A1 | 12/2007 | Jing et al. |
| 2008/0008838 A1 | 1/2008 | Arpac et al. |
| 2008/0012459 A1 | 1/2008 | Picken et al. |
| 2008/0018709 A1 | 1/2008 | Takenaka et al. |
| 2008/0020127 A1 | 1/2008 | Whiteford et al. |
| 2008/0021212 A1 | 1/2008 | Whiteford et al. |
| 2008/0032403 A1 | 2/2008 | Saito et al. |
| 2008/0039558 A1 | 2/2008 | Lazzari et al. |
| 2008/0044635 A1 | 2/2008 | O'Neill et al. |
| 2008/0050567 A1 | 2/2008 | Kawashima et al. |
| 2008/0063870 A1 | 3/2008 | O'Rear et al. |
| 2008/0066648 A1 | 3/2008 | Asakura et al. |
| 2008/0070146 A1 | 3/2008 | Fomitchev et al. |
| 2008/0081858 A1 | 4/2008 | Okazaki |
| 2008/0088192 A1 | 4/2008 | Hsu |
| 2008/0090004 A1 | 4/2008 | Zhang et al. |
| 2008/0101041 A1 | 5/2008 | Chang et al. |
| 2008/0102347 A1 | 5/2008 | Blunk |
| 2008/0107864 A1 | 5/2008 | Zhang et al. |
| 2008/0131653 A1 | 6/2008 | Lyons et al. |
| 2008/0160257 A1 | 7/2008 | Takada et al. |
| 2008/0166549 A1 | 7/2008 | Shieh et al. |
| 2008/0171805 A1 | 7/2008 | Mingarelli |
| 2008/0172937 A1 | 7/2008 | Palmer et al. |
| 2008/0176991 A1 | 7/2008 | Osawa et al. |
| 2008/0197760 A1 | 8/2008 | Leconte et al. |
| 2008/0199657 A1 | 8/2008 | Capron et al. |
| 2008/0199659 A1 | 8/2008 | Zhao |
| 2008/0205950 A1 | 8/2008 | Moorlag et al. |
| 2008/0206550 A1 | 8/2008 | Borlner |
| 2008/0207581 A1 | 8/2008 | Whiteford et al. |
| 2008/0213601 A1 | 9/2008 | Yamamoto et al. |
| 2008/0220170 A1 | 9/2008 | Van Der Flaas |
| 2008/0220676 A1 | 9/2008 | Marin et al. |
| 2008/0221009 A1 | 9/2008 | Kanagasabapathy et al. |
| 2008/0221263 A1 | 9/2008 | Kanagasabapathy et al. |

(56) References Cited

U.S. PATENT DOCUMENTS

| | | |
|---|---|---|
| 2008/0226694 A1 | 9/2008 | Gelbart et al. |
| 2008/0237126 A1 | 10/2008 | Hoek et al. |
| 2008/0241512 A1 | 10/2008 | Boris et al. |
| 2008/0241523 A1 | 10/2008 | Huignard et al. |
| 2008/0245273 A1 | 10/2008 | Vyorkka et al. |
| 2008/0246804 A1 | 10/2008 | Kawase et al. |
| 2008/0248263 A1 | 10/2008 | Kobrin |
| 2008/0250978 A1 | 10/2008 | Baumgart et al. |
| 2008/0261024 A1 | 10/2008 | Xenopoulos et al. |
| 2008/0268233 A1 | 10/2008 | Lawin et al. |
| 2008/0269358 A1 | 10/2008 | Inoue et al. |
| 2008/0280699 A1 | 11/2008 | Jarvholm |
| 2008/0286556 A1 | 11/2008 | D'Urso et al. |
| 2008/0295347 A1 | 12/2008 | Braham |
| 2008/0296252 A1 | 12/2008 | D'Urso et al. |
| 2008/0306202 A1 | 12/2008 | Lin et al. |
| 2008/0310660 A1 | 12/2008 | Lin |
| 2009/0010870 A1 | 1/2009 | Greiner et al. |
| 2009/0011222 A1 | 1/2009 | Xiu et al. |
| 2009/0011227 A1 | 1/2009 | Furukawa |
| 2009/0011960 A1 | 1/2009 | Wu |
| 2009/0018249 A1 | 1/2009 | Kanagasabapathy et al. |
| 2009/0025508 A1 | 1/2009 | Liao et al. |
| 2009/0025609 A1 | 1/2009 | Egami et al. |
| 2009/0032088 A1 | 2/2009 | Rabinowitz |
| 2009/0036978 A1 | 2/2009 | Kleiner et al. |
| 2009/0042469 A1 | 2/2009 | Simpson |
| 2009/0058247 A1 | 3/2009 | Collins et al. |
| 2009/0064894 A1 | 3/2009 | Baumgart et al. |
| 2009/0076430 A1 | 3/2009 | Simpson et al. |
| 2009/0084574 A1 | 4/2009 | Balfour et al. |
| 2009/0084914 A1 | 4/2009 | Picken et al. |
| 2009/0085453 A1 | 4/2009 | Daley et al. |
| 2009/0087670 A1 | 4/2009 | Peng et al. |
| 2009/0095941 A1 | 4/2009 | Nakata et al. |
| 2009/0099301 A1 | 4/2009 | Naraghi et al. |
| 2009/0105409 A1 | 4/2009 | Munzmay et al. |
| 2009/0105679 A1 | 4/2009 | Joubert et al. |
| 2009/0111344 A1 | 4/2009 | Murphy et al. |
| 2009/0115302 A1 | 5/2009 | Benz et al. |
| 2009/0123728 A1 | 5/2009 | Cheung et al. |
| 2009/0134758 A1 | 5/2009 | Vardon |
| 2009/0136737 A1 | 5/2009 | Ring et al. |
| 2009/0142604 A1 | 6/2009 | Imai et al. |
| 2009/0155566 A1 | 6/2009 | Gentleman et al. |
| 2009/0162592 A1 | 6/2009 | Baikerikar et al. |
| 2009/0163637 A1 | 6/2009 | Li et al. |
| 2009/0182085 A1 | 7/2009 | Escobar Barrios et al. |
| 2009/0186070 A1 | 7/2009 | Guire et al. |
| 2009/0188877 A1 | 7/2009 | Stewart |
| 2009/0195136 A1 | 8/2009 | Wing et al. |
| 2009/0212505 A1 | 8/2009 | McMillin et al. |
| 2009/0240004 A1 | 9/2009 | Maier et al. |
| 2009/0298369 A1 | 12/2009 | Koene et al. |
| 2010/0001625 A1 | 1/2010 | Eckartsberg et al. |
| 2010/0003493 A1 | 1/2010 | Cheng et al. |
| 2010/0026156 A1 | 2/2010 | Leconte et al. |
| 2010/0052491 A1 | 3/2010 | Vardon |
| 2010/0102693 A1 | 4/2010 | Driver et al. |
| 2010/0109498 A1 | 5/2010 | Ramm et al. |
| 2010/0117502 A1 | 5/2010 | Kang et al. |
| 2010/0133970 A1 | 6/2010 | Shin et al. |
| 2010/0176703 A1 | 7/2010 | Kim |
| 2010/0181884 A1 | 7/2010 | De La Garza et al. |
| 2010/0196702 A9 | 8/2010 | Furukawa |
| 2010/0213334 A1 | 8/2010 | Davenport |
| 2010/0272913 A1 | 10/2010 | Russell et al. |
| 2010/0314575 A1 | 12/2010 | Gao et al. |
| 2010/0330347 A1 | 12/2010 | Badyal et al. |
| 2011/0111656 A1 | 5/2011 | Gao et al. |
| 2011/0217544 A1 | 9/2011 | Young et al. |
| 2012/0009396 A1 | 1/2012 | Sikka et al. |
| 2012/0040577 A1 | 2/2012 | Kissel et al. |
| 2012/0045954 A1 | 2/2012 | Bleecher et al. |
| 2014/0087134 A1 | 3/2014 | Gesford et al. |
| 2014/0205804 A1 | 7/2014 | Jones et al. |
| 2015/0005424 A1 | 1/2015 | Jones et al. |
| 2015/0030779 A1 | 1/2015 | Bleecher et al. |

FOREIGN PATENT DOCUMENTS

| | | |
|---|---|---|
| EP | 0 166 363 A2 | 1/1986 |
| EP | 0 207 282 A2 | 7/1987 |
| EP | 0 307 915 A2 | 3/1989 |
| EP | 0 317 057 A2 | 5/1989 |
| EP | 0 332 141 A2 | 9/1989 |
| EP | 0 399 568 A2 | 11/1990 |
| EP | 0 446 391 A1 | 9/1991 |
| EP | 0 452 723 A1 | 10/1991 |
| EP | 0 472 215 A2 | 2/1992 |
| EP | 0 476 510 A1 | 3/1992 |
| EP | 0 493 270 A2 | 7/1992 |
| EP | 0 545 201 A2 | 6/1993 |
| EP | 0 623 656 A2 | 11/1994 |
| EP | 0 649 887 A2 | 4/1995 |
| EP | 0 657 393 A1 | 6/1995 |
| EP | 0 714 870 A1 | 6/1996 |
| EP | 0 714 921 A1 | 6/1996 |
| EP | 0 719 743 A1 | 7/1996 |
| EP | 0 719 821 A1 | 7/1996 |
| EP | 0 739 714 A2 | 10/1996 |
| EP | 0 745 567 A1 | 12/1996 |
| EP | 0 745 568 A1 | 12/1996 |
| EP | 0 752 459 A2 | 1/1997 |
| EP | 0 770 706 A1 | 5/1997 |
| EP | 0 904 343 A1 | 5/1997 |
| EP | 0 799 791 A1 | 10/1997 |
| EP | 0 811 430 A1 | 12/1997 |
| EP | 0 863 191 A2 | 9/1998 |
| EP | 0 969 718 B1 | 9/1998 |
| EP | 0 903 389 A1 | 3/1999 |
| EP | 0 914 873 A1 | 5/1999 |
| EP | 0 915 103 A1 | 5/1999 |
| EP | 0 930 351 A1 | 7/1999 |
| EP | 1 047 735 A2 | 11/2000 |
| EP | 1 048 696 A2 | 11/2000 |
| EP | 1 097 979 A1 | 5/2001 |
| EP | 1 108 735 A1 | 6/2001 |
| EP | 1 113 064 A1 | 7/2001 |
| EP | 1 136 539 A1 | 9/2001 |
| EP | 1 180 533 A1 | 2/2002 |
| EP | 1 187 872 A1 | 3/2002 |
| EP | 1 193 289 A1 | 4/2002 |
| EP | 1 215 252 A2 | 6/2002 |
| EP | 1 401 903 A2 | 9/2002 |
| EP | 1 261 559 A1 | 12/2002 |
| EP | 1 392 619 A1 | 12/2002 |
| EP | 1 392 772 A1 | 12/2002 |
| EP | 1 429 919 A1 | 2/2003 |
| EP | 1 492 837 A1 | 10/2003 |
| EP | 1 360 253 A2 | 11/2003 |
| EP | 1 362 904 A1 | 11/2003 |
| EP | 1 503 813 A1 | 11/2003 |
| EP | 1 387 011 A1 | 2/2004 |
| EP | 1 387 169 A1 | 2/2004 |
| EP | 1 407 792 A1 | 4/2004 |
| EP | 1 433 821 A1 | 6/2004 |
| EP | 1 583 615 A1 | 7/2004 |
| EP | 1 473 355 A1 | 11/2004 |
| EP | 1 475 234 A1 | 11/2004 |
| EP | 1 479 738 A1 | 11/2004 |
| EP | 1 524 290 A1 | 4/2005 |
| EP | 1 875 279 A1 | 11/2006 |
| EP | 1 883 669 A1 | 11/2006 |
| EP | 1 902 091 A2 | 1/2007 |
| EP | 1 752 284 A1 | 2/2007 |
| EP | 1 857 497 A2 | 11/2007 |
| EP | 1 873 218 A1 | 1/2008 |
| EP | 1 908 804 A1 | 4/2008 |
| EP | 1 988 129 A2 | 11/2008 |
| EP | 1 997 619 A1 | 12/2008 |
| EP | 2 346 678 | 7/2011 |
| EP | 2 678 400 | 8/2012 |
| EP | 2 791 255 | 6/2013 |

(56) References Cited

FOREIGN PATENT DOCUMENTS

| | | | |
|---|---|---|---|
| GB | 1 341 605 A | | 12/1973 |
| GB | 2484751 | * | 4/2012 |
| JP | 62-246960 A | | 10/1987 |
| JP | H05-186738 A | | 7/1993 |
| JP | H07-090691 A | | 4/1995 |
| JP | H10-309768 A | | 11/1998 |
| JP | 2004162133 A | | 6/2004 |
| JP | 2004308984 A | | 11/2004 |
| JP | 2005082616 A | | 3/2005 |
| JP | 2006131938 A | | 5/2006 |
| JP | 2007144917 A | | 6/2007 |
| JP | 2007182491 A | | 7/2007 |
| JP | 2008228958 A | | 10/2008 |
| JP | 2009071672 A | | 4/2009 |
| KR | 10-2003-052853 | | 6/2003 |
| KR | 10-2009-90240 | | 10/2010 |
| MX | 175646 | | 8/1994 |
| MX | 183533 | | 12/1996 |
| MX | 192053 | | 5/1999 |
| MX | 195031 | | 1/2000 |
| MX | 199899 | | 11/2000 |
| MX | 201072 | | 3/2001 |
| MX | 203880 | | 8/2001 |
| MX | 205074 | | 11/2001 |
| MX | PA01011653 A | | 12/2002 |
| MX | 215752 | | 8/2003 |
| MX | PA02006399 A | | 9/2003 |
| MX | PA04010165 A | | 2/2005 |
| MX | PA05006898 A | | 8/2005 |
| MX | PA02012841 A | | 1/2006 |
| MX | 234477 | | 2/2006 |
| MX | PA06003323 A | | 3/2006 |
| WO | WO 91-04305 A1 | | 4/1991 |
| WO | WO 93-16131 A1 | | 8/1993 |
| WO | WO 94-13734 A1 | | 6/1994 |
| WO | WO 96-04123 A1 | | 2/1996 |
| WO | WO 96-07621 A1 | | 3/1996 |
| WO | WO 97-07993 A1 | | 3/1997 |
| WO | WO 98-20960 A1 | | 5/1998 |
| WO | WO 99-23137 A1 | | 5/1999 |
| WO | WO 99-23437 A1 | | 5/1999 |
| WO | WO 99-40431 A1 | | 8/1999 |
| WO | WO 99-47578 A1 | | 9/1999 |
| WO | WO 99-48339 A1 | | 9/1999 |
| WO | WO 99-57185 A1 | | 11/1999 |
| WO | WO 99-64363 A1 | | 12/1999 |
| WO | WO 00-05321 A1 | | 2/2000 |
| WO | WO 00-14297 A1 | | 3/2000 |
| WO | WO 00-25938 A1 | | 5/2000 |
| WO | WO 00-34361 A1 | | 6/2000 |
| WO | WO 00-39240 A1 | | 7/2000 |
| WO | WO 00-46464 A1 | | 8/2000 |
| WO | WO 00-66241 A1 | | 11/2000 |
| WO | WO 01-19745 A1 | | 3/2001 |
| WO | WO 01-62682 A1 | | 8/2001 |
| WO | WO 01-74739 A1 | | 10/2001 |
| WO | WO 01-79142 A1 | | 10/2001 |
| WO | WO 01-79371 A2 | | 10/2001 |
| WO | WO 01-98399 A1 | | 12/2001 |
| WO | WO 02-14417 A1 | | 2/2002 |
| WO | WO 02-28951 A1 | | 4/2002 |
| WO | WO 02-062910 A2 | | 8/2002 |
| WO | WO 02-074869 A1 | | 9/2002 |
| WO | WO 02-098983 A1 | | 12/2002 |
| WO | WO 03-010255 A2 | | 2/2003 |
| WO | WO 03-012004 A1 | | 2/2003 |
| WO | WO 03-030879 A1 | | 4/2003 |
| WO | WO 03-037702 A1 | | 5/2003 |
| WO | WO 03-045693 A1 | | 6/2003 |
| WO | WO 03-063646 A2 | | 8/2003 |
| WO | WO 03-080258 A2 | | 10/2003 |
| WO | WO 03-082998 A1 | | 10/2003 |
| WO | WO 03-093568 A1 | | 11/2003 |
| WO | WO 2004-012625 A2 | | 2/2004 |
| WO | WO 2004-043319 A2 | | 5/2004 |
| WO | WO 2004-058418 A1 | | 7/2004 |
| WO | WO 2004-104116 A1 | | 12/2004 |
| WO | WO 2004-110132 A2 | | 12/2004 |
| WO | WO 2005-021843 A1 | | 3/2005 |
| WO | WO 2005-023935 A1 | | 3/2005 |
| WO | WO 2005-028562 A1 | | 3/2005 |
| WO | WO 2005-068399 A1 | | 7/2005 |
| WO | WO 2005-077429 A1 | | 8/2005 |
| WO | WO 2006/044641 A2 | | 4/2006 |
| WO | WO 2006-044642 A2 | | 4/2006 |
| WO | WO 2006-081891 A1 | | 8/2006 |
| WO | WO 2006-083600 A1 | | 8/2006 |
| WO | WO 2006-101934 A1 | | 9/2006 |
| WO | WO 2006-135755 A2 | | 12/2006 |
| WO | WO 2007-011731 A2 | | 1/2007 |
| WO | WO 2007-027276 A1 | | 3/2007 |
| WO | WO 2007-052260 A2 | | 5/2007 |
| WO | WO 2007-053266 A1 | | 5/2007 |
| WO | WO 2007-056427 A2 | | 5/2007 |
| WO | WO 2007-070801 A2 | | 6/2007 |
| WO | WO 2007-075407 A1 | | 7/2007 |
| WO | WO 2007-092746 A2 | | 8/2007 |
| WO | WO 2007-102960 A2 | | 9/2007 |
| WO | WO 2007-104494 A1 | | 9/2007 |
| WO | WO 2007-126432 A1 | | 11/2007 |
| WO | WO 2007-126743 A1 | | 11/2007 |
| WO | WO 2007-130294 A2 | | 11/2007 |
| WO | WO 2007-149617 A1 | | 12/2007 |
| WO | WO 2008-004827 A1 | | 1/2008 |
| WO | WO 2008-004828 A1 | | 1/2008 |
| WO | WO 2008-006078 A2 | | 1/2008 |
| WO | WO 2008-021791 A2 | | 2/2008 |
| WO | WO 2008-035347 A2 | | 3/2008 |
| WO | WO 2008-035917 A1 | | 3/2008 |
| WO | WO 2008-050895 A1 | | 5/2008 |
| WO | WO 2008-051221 A2 | | 5/2008 |
| WO | WO 2008-066828 A2 | | 6/2008 |
| WO | WO 2008-078346 A1 | | 7/2008 |
| WO | WO 2008-106494 A1 | | 9/2008 |
| WO | WO 2008-112158 A1 | | 9/2008 |
| WO | WO 2008-123650 A1 | | 10/2008 |
| WO | WO 2008-123955 A1 | | 10/2008 |
| WO | WO 2008-123961 A1 | | 10/2008 |
| WO | WO 2008-134243 A1 | | 11/2008 |
| WO | WO 2008-137973 A1 | | 11/2008 |
| WO | WO 2008-151991 A1 | | 12/2008 |
| WO | WO 2008-153687 A2 | | 12/2008 |
| WO | WO 2009-003847 A1 | | 1/2009 |
| WO | WO 2009-005465 A1 | | 1/2009 |
| WO | WO 2009-012116 A2 | | 1/2009 |
| WO | WO 2009-018327 A2 | | 2/2009 |
| WO | WO 2009-037717 A2 | | 3/2009 |
| WO | WO 2009-041752 A1 | | 4/2009 |
| WO | WO 2009-061199 A1 | | 5/2009 |
| WO | WO 2009-148611 A1 | | 12/2009 |
| WO | WO 2009-158567 A1 | | 12/2009 |
| WO | WO 2010/033288 A2 | * | 3/2010 |
| WO | 2010/042191 A1 | | 4/2010 |
| WO | WO 2010-042668 A1 | | 4/2010 |
| WO | WO 2011-151151 A1 | | 12/2011 |
| WO | WO 2012-115986 A1 | | 8/2012 |
| WO | WO 2013-090939 A1 | | 6/2013 |
| WO | WO 2014-003852 A9 | | 1/2014 |

OTHER PUBLICATIONS

Supplementary European Search Report, European Application No. EP 12 85 7248 (published as European Publication No. 2 791 255) (Apr. 7, 2015).
U.S. Appl. No. 60/699,200, filed Jul. 14, 2005, Guire et al. (Innovative Surface Technologies, Inc.).
U.S. Appl. No. 60/807,143, filed Jul. 12, 2006, Guire et al. (Innovative Surface Technologies, Inc.).
U.S. Appl. No. 60/891,876, filed Feb. 27, 2007, Lawin et al. (Innovative Surface Technologies, Inc.).
U.S. Appl. No. 61/058,902, filed Jun. 4, 2008, Driver et al.
U.S. Appl. No. 61/090,002, filed Aug. 19, 2008, Driver et al.
U.S. Appl. No. 61/133,273, filed Jun. 27, 2008, Driver et al.

(56) References Cited

OTHER PUBLICATIONS

U.S. Appl. No. 61/198,414, filed Jun. 16, 2009, Gao.
U.S. Appl. No. 61/216,540, filed May 18, 2009, Driver et al.
U.S. Appl. No. 61/252,229, filed Oct. 16, 2009, Gao.
EP App 06787306.7 prosecution history now EP 1 902 091, As of May 22, 2013, Guire (innovative Surface Technologies) (published as WO2007/11731).
"composition," in *Collins English Dictionary*, found at http://www.credoreference.com/entry/hcengdict/composition, 2000 (viewed Aug. 26, 2013).
"NeverWet—product characteristics," found at http://www.neverwet.com/product-characteristics.php, NeverWet LLC (viewed Mar. 7, 2013).
"Yield strength, elastic limit, and ultimate strength," found at http://inventor.grantadesign.com/en/notes/science/material/S04%20strength.htm, Granta Design Ltd. (viewed Feb. 10, 2015).
2009 R&D 100 Award Entry Form (p. 5 excerpt from another document) showing Fig. 1 Schematic of NICE ("no ice nanocoating") (2009).
Bae et al., "Superhydrophobicity of cotton fabrics treated with silica nanoparticles and water-repellent agent," *J Colloid Interface Sci*, abstract only (May 3, 2009; epublication ahead of print).
Bayer Materials Science product information on Bayhydrol® 140AQ, polyurethane dispersion (Aug. 2002).
Bayer Materials Science product information on Bayhydrol® 110 polyurethane dispersion (two first pages Of this brochure) (Aug. 2002).
Bayer Materials Science product information on Bayhydrol® 122 polyurethane dispersion (Jan. 2004).
Bayer Materials Science product information on Bayhydrol® 124 polyurethane dispersion (Jan. 2004).
Bayer Materials Science product information on Bayhydrol® A145, aqueous hydroxyl-functional polyurethane dispersion (Jan. 2010).
Beyler et al, "Thermal Decomposition of Polymers," Chapter 7 of *The SFPE Handbook of Fire Protection Engineering* ($3^{rd}$ ed.), pp. 1-110-1-131 (2002).
Bliznakov et al., "Double-scale roughness and superhydrophobicity on metalized Toray carbon fiber paper," *Langmuir*, 25(8):4760-4766, abstract only (Apr. 21, 2009).
Boinovich et al., "Principles of design of superhydrophobic coatings by deposition from dispersions," *Langmuir*, 25(5):2907-2912, abstract only (Mar. 3, 2009).
Boinovich et al., "Principles of Design of Superhydrophobic Coatings by Deposition from Dispersions," *Langmuir*, abstract only (Feb. 10, 2009; epublication ahead of print).
Bravo et al., "Transparent superhydrophobic films based on silica nanoparticles," *Langmuir*, 23(13):7293-7298, abstract only (Jun. 19, 2007; epublished May 25, 2007).
Choi et al., "Large slip of aqueous liquid flow over a nanoengineered superhydrophobic surface," *Phys Rev Lett*, 96(6):066001, abstract only (Feb. 17, 2006; epublished Feb. 16, 2006).
Clark, M.D.T. et al. "Paints and Pigments" available at nzic.org.nz/ChemProcesses/polymers/10D.pdf (copyright 2005-2008 at http://nzic.org.nz/ChemProcesses/polymers/).
de Givenchy et al., "Fabrication of Superhydrophobic PDMS Surfaces by Combining Acidic Treatment and Perfluorinated Monolayers," *Langmuir*, 25(11):6448-6453, abstract only (Jun. 2, 2009).
Du, "Surfactants, Dispersants, and Defoamers for the Coatings, Inks, and Adhesives Industries," in *Coatings Technology Handbook, Third Edition*, Tracton (ed.), CRC Press (2005).
EPO Communication dated Dec. 5, 2011, regarding third-party observations filed in European Application No. 09771098.2.
Expancel DE product list, "Product Specification for Expancel® Microspheres," Issue Oct. 2010, AkzoNobel (Oct. 2010).
Extended European search report for European Application No. 092119918, dated Jul. 22, 1997.
Extended European search report for European Application No. 09771098.2, dated Dec. 27, 2011.
Extended European search report for European Application No. 0981951.8, dated Jul. 22, 2014.

Fürstner et al., "Wetting and self-cleaning properties of artificial superhydrophobic surfaces," *Langmuir*, 21(3):956-961, abstract only (Feb. 1, 2005).
García et al., "Use of p-toluenesulfonic acid for the controlled grafting of alkoxysilanes onto silanol containing surfaces; preparation of tunable hydrophilic, hydrophobic, and super-hydrophobic silica," *J Am Chem Soc*, 129(16):5052-5060, abstract only (Apr. 25, 2007; epublished Mar. 31, 2007).
Gonçalves et al., "Superhydrophobic cellulose nanocomposites," *J. Colloid Interface Sci*, 324(1-2):42-46, abstract only (Aug. 2008; epublished May 7, 2008).
Guo et al., "A novel approach to stable superhydrophobic surfaces," *Chemphyschem*, 7(8):1674-1677, abstract only (Aug. 11, 2006; epublished Jul. 17, 2006).
In re Inter Partes Review of USP 8,286,561, Amended Petition for Inter Partes Review of U.S. Patent No. 8,286,561 Under 35 U.S.C. §§ 311-319 and 37 C.F.R. § 42.100 et seq., Trial No. IPR2013-00358 (Jun. 21, 2013).
In re Inter Partes Review of USP 8,286,561, Christopher B. Schechter Deposition, Trial No. IPR2013-00358 (Jan. 23, 2014).
In re Inter Partes Review of USP 8,286,561, Decision, Trial No. IPR2013-00358 (Nov. 14, 2013).
In re Inter Partes Review of USP 8,286,561, Declaration of Bradley M. Nall—Redacted Version, Trial No. IPR2013-00358 (Jan. 17, 2014).
In re Inter Partes Review of USP 8,286,561, Declaration of Chris B. Schechter, Trial No. IPR2014-00367 (Jan. 21, 2014).
In re Inter Partes Review of USP 8,286,561, Declaration of John Driver, Trial No. IPR2013-00358 (Feb. 7, 2014).
In re Inter Partes Review of USP 8,286,561, Patent Owner Preliminary Response Under 37 C.F.R. §§ 42.107, Trial No. IPR2013-00358 (Aug. 14, 2013).
In re Inter Partes Review of USP 8,286,561, Patent Owner Preliminary Response, Trial No. IPR2014-00367 (Apr. 29, 2014).
In re Inter Partes Review of USP 8,286,561, Patent Owner Response Under 37 C.F.R. §§ 42.120, Trial No. IPR2013-00358 (Feb. 7, 2014).
In re Inter Partes Review of USP 8,286,561, Patent Owner's Motion for Additional Discovery Pursuant to 37 C.F.R. §42.51(b)(2)—Redacted Version, Trial No. IPR2013-00358 (Aug. 14, 2013).
In re Inter Partes Review of USP 8,286,561, Paul Saunders Deposition, Trial No. IPR2013-00358 (Apr. 11, 2014).
In re Inter Partes Review of USP 8,286,561, Petition for Inter Partes Review of U.S. Patent No. 8,286,561 Under 35 U.S.C. §§ 311-319 and 37 C.F.R. § 42.100 et seq., Trial No. IPR2013-00358 (Jun. 14, 2013).
In re Inter Partes Review of USP 8,286,561, Petition for Inter Partes Review of U.S. Patent No. 8,286,561 Under 35 U.S.C. §§ 311-319 and 37 C.F.R. § 42.100 et seq., Trial No. IPR2014-00367 (Jan. 18, 2014).
In re Inter Partes Review of USP 8,286,561, Petitioner's Reply to Patent Owner's Response to Petition—Public Redacted Version, Trial No. IPR2013-00358 (Apr. 22, 2014).
In re Inter Partes Review of USP 8,286,561, Second Declaration of Bradley M. Nall, Trial No. IPR2013-00358 (Feb. 6, 2014).
In re Inter Partes Review of USP 8,286,561, Second Notice of Deposition of Paul Saunders Pursuant to 37 C.F.R. § 42.53, Trial No. IPR2013-00358 (Apr. 10, 2014).
International Preliminary Report on Patentability for International Application No. PCT/US2009/048775, dated Jan. 13, 2011.
International Preliminary Report on Patentability for International Application No. PCT/US2010/059909, dated Apr. 21, 2011.
International Search Report and Written Opinion for International Application No. PCT/US2009/005512, dated Dec. 8, 2009.
International Search Report and Written Opinion for International Application No. PCT/US2009/048775, dated Nov. 19, 2009.
International Search Report and Written Opinion for International Application No. PCT/US2009/059909, dated Dec. 4, 2009.
International Search Report and Written Opinion for International Application No. PCT/US2010/048711, dated Mar. 17, 2011.
International Search Report and Written Opinion for International Application No. PCT/US2010/054936, dated Feb. 16, 2011.
International Search Report and Written Opinion for International Application No. PCT/US2012/025982, dated Jun. 13, 2012.

(56) References Cited

OTHER PUBLICATIONS

International Search Report and Written Opinion for International Application No. PCT/US2013/031751, dated Dec. 23, 2013.
International Search Report and Written Opinion for International Application No. PCT/US2014/057848, dated Dec. 29, 2014.
Jauregui-Beloqui et al., "Thermoplastic polyurethane-fumed silica composites: influence of the specific surface area of fumed silica on the viscoelastic and adhesion properties," *Journal of Adhesive Science and Technology*, 13(6):695-711, abstract only (1999).
Kietzig et al., "Patterned superhydrophobic metallic surfaces," *Langmuir*, 25(8):4821-4827, abstract only (Apr. 21, 2009).
Kim et al., "A simple fabrication route to a highly transparent superhydrophobic surface with a poly(dimethylsiloxane) coated flexible mold," *Chem Commun (Camb)*, 22:2237-2239, abstract only (Jun. 14, 2007; epublished Mar. 6, 2007).
Kobayashi et al., Surface Tension of Poly[(3,3,4,4,5,5,6,6,6-nonafluorohexyl)-methylsiloxane], *Macromolecules*, 23:4929-4933 (1990).
Kraton® FG1924 G Polymer, Data Document, Identifier K123DDe09U, the KRATON Polymers Group of Companies (Aug. 10, 2009).
Le Marechal et al., "Textile Finishing Industry as an Important Source of Organic Pollutants," in *Organic Pollutants Ten Years After the Stockholm Convention—Environmental and Analytical Update*, Puzyn (ed.), Chapter 2, pp. 29-54, InTech (2012).
Lee et al., "Impact of a superhydrophobic sphere onto water," *Langmuir*, 24(1):142-145, abstract only (Jan. 1, 2008; epublished Nov. 14, 2007).
Li et al., "Conversion of a metastable superhydrophobic surface to an ultraphobic surface," *Langmuir*, 24(15):8008-8012, abstract only (Aug. 5, 2008; epublished Jul. 8, 2008).
Ling et al., "Stable and transparent superhydrophobic nanoparticle films," *Langmuir*, 25(5):3260-3263, abstract only (Mar. 3, 2009).
Litvinov et al., "Structure of a PDMS Layer Grafted onto a Silica Surface Studied by Means of DSC and Solid-State NMR," *Macromolecules*, 35(11):4356-4364 (2002).
Manca et al., "Durable superhydrophobic and antireflective surfaces by trimethylsilanized silica nanoparticles-based sol-gel processing," *Langmuir*, 25(11):6357-6362, abstract only (Jun. 2, 2009).
Marmur, "Super-hydrophobicity fundamentals: implications to biofouling prevention," *Biofouling*, 22(1-2):107-115, abstract only (2006).
Ming et al., "Toward Superlyophobic Surfaces," *Contact Angle, Wettability and Adhesion* (ed. Mittal), vol. 6, pp. 191-205, Koninklijke Brill NV, Leiden (2009).
Nosonovsky et al., "Patterned nonadhesive surfaces: superhydrophobicity and wetting regime transitions," *Langmuir*, 24(4):1525-1533, abstract only (Feb. 19, 2008; epublished Dec. 12, 2007).
Park et al., "Wetting transition and optimal design for microstructured surfaces with hydrophobic and hydrophilic materials," *J. Colloid Interface Sci*, 336(1):298-303, abstract only (Aug. 1, 2009; epublished Apr. 15, 2009).
Perez, Jr., et al., "Performance and Processing Enhancements of Aromatic Polyurea Elastomer Systems Prepared from High 2,4'-MDI Isocyanates," in *Polyurethanes Conference 2000: Defining the Future Through Technology*, Boston, Massachusetts, pp. 219-232 (Oct. 8-11, 2000).

Piret et al., "Biomolecule and nanoparticle transfer on patterned and heterogeneously wetted superhydrophobic silicon nanowire surfaces," *Langmuir*, 24(5):1670-1672, abstract only (Mar. 4, 2008; epublished Feb. 6, 2008).
Puukilainen et al., "Superhydrophobic polyolefin surfaces: controlled micro- and nanostructures," *Langmuir*, 23(13):7263-7268, abstract only (Jun. 19, 2007; epublished May 23, 2007).
Sakai et al., "Direct observation of internal fluidity in a water droplet during sliding on hydrophobic surfaces," *Langmuir*, 22(11):4906-4909, abstract only (May 23, 2006).
Sherwin Williams Chemical Coatings product information for CC-D14, POLANE® 2.8T, plus polyurethane enamel (Oct. 19, 2006).
Sherwin Williams Chemical Coatings product information for CC-D5, POLANE® T, polyurethane enamel (Sep. 2001).
Sherwin Williams Chemical Coatings product information for CC-E14, POLANE® 700T, water reducible enamel (May 2010).
Shirtcliffe et al., "Wetting and wetting transitions on copper-based super-hydrophobic surfaces," *Langmuir*, 21(3):937-943, abstract only (Feb. 1, 2005).
Smith et al., "Modeling of PDMS—Silica Nanocomposites," *NSTI-Nanotech*, 3:115-118 (2004).
*SSW Holding Company, Inc. v. Schott Gemtron Corporation*, Civil Docket, Civil Action No. 3:12-cv-00661-CRS (as of Dec. 6, 2013).
*SSW Holding Company, Inc. v. Schott Gemtron Corporation*, Complaint for Patent Infringement, Demand for Jury Trial, Civil Action No. 3:12-cv-00661-CRS (Oct. 16, 2012).
Su et al., "From Suerhydrophophilic to Superhydrophobic: Controlling Wettability of Hydroxide Zinc Carbonate Film on Zinc Plates," *Langmuir*, abstract only (Feb. 10, 2009; epublication ahead of print).
Synytska et al., "Wetting on Fractal Superhydrophobic Surfaces from 'Core-Shell' Particles: A Comparison of Theory and Experiment," *Langmuir*, abstract only (Feb. 10, 2009; epublication ahead of print).
Torró-Palau et al., "Characterization of polyurethanes containing different silicas," *International Journal of Adhesion and Adhesives*, 21(1):1-9, abstract only (2001).
Two webpages re pigment particle size: http://www.specialchem4coatings.com/tc/color-handbook/index.aspx?id=size and http://www.specialchem4coatings.com/tc/tio2/index.aspx?id=whiteness, SpecialChem, S.A. (printed on Jul. 19, 2013).
Venkateswara et al., "Preparation of MTMS based transparent superhydrophobic silica films by sol-gel method," *J Colloid Interface Sci*, 332(2):484-490, abstract only (Apr. 15, 2009; epublished Jan. 14, 2009).
Wang et al., "One-step coating of fluoro-containing silica nanoparticles for universal generation of surface superhydrophobicity," *Chem Commun (Camb)*, 7:877-879, abstract only (Feb. 21, 2008; epublished Dec. 18, 2007).
Yang et al., "Influence of surface roughness on superhydrophobicity," *Phys Rev Lett*, 97(11):116103, abstract only (Sep. 15, 2006; epublished Septenber 14, 2006).
Zhang et al., "Application of superhydrophobic edge effects in solving the liquid outflow phenomena," *Langmuir*, 23(6):3230-3235, abstract only (Mar. 13, 2007; epublished Jan. 25, 2007).
Zhou et al., "Study on the morphology and tribological properties of acrylic based polyurethane/fumed silica composite coatings," *Journal of Materials Science*, 39:1593-1594, abstract only (2004).

\* cited by examiner

COMPOSITION AND COATING FOR HYDROPHOBIC PERFORMANCE

CROSS-REFERENCE TO RELATED APPLICATIONS

This application is a continuation of International Application No. PCT/US2012/070200, filed Dec. 17, 2012, which claims the benefit of U.S. Provisional Application No. 61/583,178, filed Jan. 4, 2012 and U.S. Provisional Application No. 61/570,988, filed Dec. 15, 2011, the entirety of each of which application is incorporated, herein by reference.

BACKGROUND AND SUMMARY

This disclosure relates to the preparation of hydrophobic and/or oleophobic coatings that are compatible with various forms of application and the associated packaging including, but not limited to packaging for various forms of spray applications (e.g., standard aerosol spray cans or canisters). Embodiments of coatings described herein provide rapid drying properties. Embodiments of coatings compositions described herein employ volatile organic compounds (VOC) that are exempt under US EPA regulations (VOC-exempt compounds), such as acetone.

The coatings described herein are useful for many applications. As but one example, embodiments of coatings described herein are useful for coating electronic components that are not subject to direct contact and wear, such as circuit boards that can be damaged by liquids, conductive aqueous solutions, and/or high humidity. Embodiments of the coating compositions described herein electronic applications include one or more of compatibility with a variety of electronic components, ease of application using standard spray equipment, rapid drying, and/or a hardness levels that still permit electronic connections to be made using connectors that penetrate the coating to reach contacts.

DETAILED DESCRIPTION

1.0 DEFINITIONS

For the purposes of this disclosure a hydrophobic surface is one that results in a water droplet forming a surface contact angle exceeding about 90° and less than 150° at room temperature (about 18° C. to about 23° C.). Similarly, for the purposes of this disclosure a superhydrophobic surface is one that results in a water droplet forming a surface contact angle of 150° or greater, but less than the theoretical maximum contact angle of about 180° at room temperature. Some authors further categorize hydrophobic behavior and employ the term "ultrahydrophobic." Since, for the purposes of this disclosure, a superhydrophobic surface has contact angles of 150° to about 180°, superhydrophobic behavior is considered to include ultrahydrophobic behavior. For the purposes of this disclosure, the terms hydrophobicity or hydrophobic (HP) shall include superhydrophobic behavior, unless stated otherwise, and any and all embodiments, claims, and aspects of this disclosure reciting hydrophobic behavior may be limited to either hydrophobic behavior that is not superhydrophobic (contact angles from) 90°-150° or superhydrophobic behavior (contact angles of 150° or greater).

For the purposes of this disclosure, an oleophobic material or surface is one that results in a droplet of light mineral oil forming a surface contact angle exceeding about 90° and less than 150° at room temperature (about 18 to about 23° C.). Similarly, for the purposes of this disclosure a superoleophobic surface is one that results in a droplet of light mineral oil forming a surface contact angle of 150° or greater, but less than the theoretical maximum contact angle of about 180° at room temperature. For the purposes of this disclosure, the term oleophobicity or oleophobic (OP) shall include superoleophobic behavior, unless stated otherwise, and any and all embodiments, claims, and aspects of this disclosure reciting oleophobic behavior may be limited to either oleophobic behavior that is not superoleophobic (contact angles from 90°-150° or superoleophobic behavior (contact angles of 150° or greater).

The following procedure can be employed to determine if a coating composition is rapid drying (or rapidly drying) for the purposes of this disclosure. The coating composition is applied at about 2.5 square meters/liter on a substantially planar aluminum test plate that is held substantially constant at a temperature of approximately 23° C. The coating is applied using 5 passes of a substantially equal amount, and each coating becomes dry to the touch (i.e., does not transfer to or stick to a surface brought in contact with the coated area) in less than 60 seconds, provided that solvent in the composition can freely evaporate, but without acceleration of drying by heating or forced air circulation (applying a stream of air).

Embodiments of such coatings generally will have a final thickness of from about 12.7 to about 25.4 microns (i.e., about 0.5 to about 1 mil thickness).

Surfaces coated with rapidly drying compositions typically can be contacted with water about 10 minutes after the application of the last pass without sustaining damage that will affect the coating's hydrophobicity, and are fully usable in less than about one hour at room temperature without accelerating drying by heating or air forced circulation, again provided that solvent can evaporate freely (e.g., the atmosphere is not at or near saturation with solvent so that its evaporation is hindered and the coated surface is maintained at room temperature).

Alkyl as used herein denotes a linear or branched alkyl radical or group. Alkyl groups may be independently selected from $C_1$ to $C_{20}$ alkyl, $C_2$ to $C_{20}$ alkyl, $C_4$ to $C_{20}$ alkyl, $C_6$ to $C_{18}$ alkyl, $C_6$ to $C_{16}$ alkyl, or $C_6$ to $C_{20}$ alkyl. Unless otherwise indicated, alkyl does not include cycloalkyl.

Cycloalkyl as used herein denotes a cyclic alkyl radical or group. Cycloalkyl groups may be independently selected from: $C_4$ to $C_{20}$ alkyl comprising one, two, or more $C_4$ to $C_8$ cycloalkyl functionalities; $C_5$ to $C_{18}$ alkyl comprising one, two, or more $C_4$ to $C_8$ cycloalkyl functionalities; $C_6$ to $C_{20}$ alkyl comprising one, two, or more $C_4$ to $C_8$ cycloalkyl functionalities; $C_6$ to $C_{18}$ alkyl comprising one, two, or more $C_4$ to $C_8$ cycloalkyl functionalities; or $C_6$ to $C_{16}$ alkyl comprising one, two or more $C_4$ to $C_8$ cycloalkyl functionalities. Where two or more cycloalkyl groups are present, they may be present as fused rings or in a spiro configuration. One or more hydrogen atoms of the cycloalkyl groups may be replaced by fluorine atoms.

Haloalkyl as used herein denotes an alkyl group in which some or all of the hydrogen atoms present in an alkyl group have been replaced by halogen atoms. Halogen atoms may be limited to chlorine or fluorine atoms in haloalkyl groups.

Fluoroalkyl as used herein denotes an alkyl group in which some or all of the hydrogen atoms present in an alkyl group have been replaced by fluorine atoms.

Perfluoroalkyl as used herein denotes an alkyl group in which fluorine atoms have been substituted for each hydrogen atom present in the alkyl group.

2.0 DESCRIPTION OF EMBODIMENTS OF COATING COMPONENTS AND PROPERTIES

It has been found that coating compositions comprising nano-particles treated with agents that provide hydrophobic properties (e.g., silica or fumed silica nano-particles treated with a silanizing agent or siloxane), a rapidly drying polymer binder comprising an acrylic polymer or copolymer, and a volatile organic solvent affords a coating that has drophobic and/or oleophobic characteristics. Such compositions can be prepared using environmentally acceptable VOC-exempt compounds such as acetone and/or t-butyl acetate (tert butyl acetate). The preparations can be applied by spraying, dipping, or any other suitable method of contacting the composition with a surface. The composition may be used to treat various surfaces including metal, plastic, and fabric.

2.1 Binders

The coating compositions described herein may comprise one or more of a variety of acrylic binders including, but not limited to, polymers or copolymers of methyl methacrylate (MMA), butyl methacrylate (BMA), ethyl methacrylate (EMA) and combinations thereof. In one embodiment, the coating compositions comprise two or more of MMA, BMA, and EMA. In other embodiments, the coating compositions comprise: MMA and BMA (e.g., PARALOID™ B64); MMA and EMA; or BMA and EMA copolymers.

The acrylic binders are typically present from about 0.4% to 10% weight to volume. In some embodiments the acrylic binders are present from about 0.5% to 9%, or about 0.6% to about 8%, or about 0.7% to about 7%, or about 0.8% to about 6.%, or about 1% to about 5.5%, or about 2%-about 5% w/v. In other embodiments the binders are present from about 0.2% to about 2%, about 2.1% to about 4.0%, about 4.1% to about 6.0%, about 6.1% to about 8.0%, about 8.1% to about 10%, about 10% to about 12.5%, about 12.5% to about 15%, about 15% to about 17.5%, about 17.5% to about 20%, or above 20% w/v based on the total final volume of the composition. Typically, the acrylic binder will be present in amounts less than 10% w/v or less than 5% w/v.

2.2 Particles

2.2.1 Nano-Particles

Nano-particles treated to be hydrophobic can be employed in the coating composition. Embodiments of such nano-particles include, e.g., silica, alumina and/or $TiO_2$. For example, in one embodiment, silica nano-particles suitable for use in the coating composition comprise fumed silica nano-particles (e.g., Nanogel TLD201, CAB-O-SIL® TS-720, or M5 from Cabot Corp., Billerica, Mass.) that have been reacted with a silanizing agent or treated with a siloxane (e.g. polydimethyl siloxane that may or may not be terminated with a silanol (CAS 63148-62-9 or 70131-67-8)).

In embodiments where a silanizing agent is employed, the silanizing agent may be a compound of the formula (I):

$$R_{4-n}Si\text{---}X_n \quad (I)$$

where n is an integer from 1 to 3;

each R is independently selected from (i) alkyl or cycloalkyl group optionally substituted with one or more fluorine atoms, (ii) $C_{1\ to\ 20}$ alkyl optionally substituted with one or more substituents independently selected from fluorine atoms and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents, (iii) $C_{2\ to\ 8}$ or $C_{6\ to\ 20}$ alkyl ether optionally substituted with one or more substituents independently selected from fluorine and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents, (iv) $C_{6\ to\ 14}$ aryl, optionally substituted with one or more substituents independently selected from halo or alkoxy, and haloalkoxy substituents, (v) $C_{4\ to\ 20}$ alkenyl or $C_{4\ to\ 20}$ alkynyl, optionally substituted with one or more substituents independently selected from halo, alkoxy, or haloalkoxy, and (vi) ---Z---$((CF_2)_q(CF_3))_r$, wherein Z is a $C_{1\ to\ 12}$ or a $C_{2\ to\ 8}$ divalent alkane radical or a $C_{2\ to\ 12}$ divalent alkene or alkyne radical, q is an integer from 1 to 12, and r is an integer from 1 to 4;

each X is an independently selected ---H, ---Cl, ---I, ---Br, ---OH, ---$OR^2$, ---$NHR^3$, or ---$N(R^3)_2$ group;

each $R^2$ is an independently selected $C_{1\ to\ 4}$ alkyl or haloalkyl group; and each $R^3$ is an independently selected H, $C_{1\ to\ 4}$ alkyl, or haloalkyl group.

In some embodiments, R is an alkyl or fluoroalkyl group having from 6 to 20 carbon atoms.

In other embodiments, R is an alkyl or fluoroalkyl group having from 8 to 20 carbon atoms.

In other embodiments, R is an alkyl or fluoroalkyl group having from 10 to 20 carbon atoms.

In other embodiments, R is an alkyl or fluoroalkyl group having from 6 to 20 carbon atoms and n is 3.

In other embodiments, R is an alkyl or fluoroalkyl group having from 8 to 20 carbon atoms and n is 3.

In other embodiments, R is an alkyl or fluoroalkyl group having from 10 to 20 carbon atoms and n is 3.

In other embodiments, R has the form ---Z---$((CF_2)_q(CF_3))_r$, wherein Z is a $C_{1\ to\ 12}$ divalent alkane radical or a $C_{2\ to\ 12}$ divalent alkene or alkyne radical, q is an integer from 1 to 12, and r is an integer from 1 to 4.

In any of the previously mentioned embodiments of compounds of formula (I), the value of n may be varied such that 1, 2 or 3 independently selected terminal functionalities are present. Thus, in some embodiments, n is 3. In other embodiments, n is 2. In still other embodiments, n is 1.

In any of the previously mentioned embodiments of compounds of formula (I), all halogen atoms present in any one or more R groups may be fluorine.

In any of the previously mentioned embodiments of compounds of formula (I), X may be independently selected from H, Cl, ---$OR^2$, ---$NHR^3$, ---$N(R^3)_2$, or combinations thereof. In other embodiments, X may be selected from Cl, ---$OR^2$, ---$NHR^3$, ---$N(R^3)_2$, or combinations thereof. In still other embodiments, X may be selected from ---Cl, ---$NHR^3$, ---$N(R^3)_2$ or combinations thereof.

Any coating described herein may be prepared with one, two, three, four or more compounds of formula (I) employed alone or in combination to modify the nano-particles, and/or other components of the coating including filler-particles. The use of silanizing agents of formula (I) to modify nano-particles, or any of the other components of the coatings, will introduce one or more $R_{3-n}X_nSi$--- groups (e.g., $R_3Si$---, $R_2X_1Si$---, or $RX_2Si$--- groups) where R and X are as defined for a compound of formula (I). The value of n is 0, 1, or 2, due to the displacement of at least one "X" substituent and formation of at least one bond between a nano-particle and the Si atom (the bond between the nano-particle and the silicon atom is indicated by a dash "—" (e.g., $R_3Si—$, $R_2X_1Si—$, or $RX_2Si—$ groups).

In other embodiments, suitable silanizing agents for modifying the nano-particles used in the coating compositions generally comprise those with fluorinated or polyfluorinated alkyl groups (e.g., fluoroalkyl groups) or alkyl groups (hydrocarbon containing groups) including, but not limited to:

tridecafluoro-1,1,2,2-tetrahydrooctyl)silane (SIT8173.0);
(tridecafluoro-1,1,2,2-tetrahydrooctyl)trichlorosilane (SIT8174.0);
(tridecafluoro-1,1,2,2-tetrahydrooctyl)triethoxysilane (SIT8175.0);
(tridecafluoro-1,1,2,2-tetrahydrooctyl)trimethoxysilane (SIT8176.0);
(heptadecafluoro-1,1,2,2-tetrahydrodecyl)dimethyl(dimethylamino)silane (SIH5840.5);
(heptadecafluoro-1,1,2,2-tetrahydrodecyl)tris(dimethylamino)silane (SIH5841.7);
n-octadecyltrimethoxysilane (SIO6645.0); n-octyltriethoxysilane (SIO6715.0); and
nonafluorohexyldimethyl(dimethylamino)silane (SIN6597.4);

where the designations given in parentheses are the product numbers from Gelest, Inc., Morrisville, Pa.

Nano-particles may be selected to have an average diameter from about 8 nm to about 100 nm. For example, in embodiments the nano-particles can have an average diameter of about 10 to about 75 nm. In other embodiments the nano-particles may have a size from about 12 to about 60 nm, 1 about 4 to about 50 nm, or about 15 to about 40 nm. In other embodiments, the average size of the nano-particles is about 10, about 15, about 20, about 25, about 30 or about 40 nm.

Nano-particles typically may be included in the coating composition in a range of about 0.1% to about 10%, about 0.2% to about 7.5%, about 0.5% to about 6%, about 0.8% to about 5%, or about 1% to about 4% on a weight to volume (w/v) basis. Depending on the particular composition involved, amounts above 10% may also provide acceptable results.

2.2.2 Filler-Particles

Filler-particles, also known as extenders, may optionally be incorporated into the coating compositions to develop surface texture, which increases the durability (abrasion resistance) of the coatings. Filler-particles may be prepared from diverse materials including, but not limited to, particles comprising: wood (e.g., wood dust), glass, metals (e.g., iron, titanium, nickel, zinc, tin), alloys of metals, metal oxides, metalloid oxides (e.g., silica), plastics (e.g., thermoplastics), carbides, nitrides, borides, spinels, diamonds, and fibers (e.g., glass fibers).

Numerous variables may be considered in the selection of filler-particles. These variables include, but are not limited to, the effect the filler-particles have on the resulting coatings, their size, their hardness, their compatibility with the binder, the resistance of the filler-particles to the environment in which the coatings will be employed, and the environment the filler-particles must endure in the coating and/or curing process, including resistance to temperature and solvent conditions.

In embodiments described herein, filler-particles have an average size in a range selected from about 1 micron (μm) to about 300 μm or from about 30 μm to about 225 μm. Within such ranges, embodiments include ranges of filler-particles having an average size of from about 1 μm to about 5 μm, from about 5 μm to about 10 μm, from about 10 μm to about 15 μm, from about 15 μm to about 20 μm, from about 20 μm to about 25 μm, from about 1 μm to about 25 μm, from about 5 μm to about 25 μm, from about 25 μm to about 50 μm, from about 50 μm to about 75 μm, from about 75 μm to about 100 μm, from about 100 μm to about 125 μm, from about 125 μm to about 150 μm, from about 150 μm to about 175 μm, from about 175 μm to about 200 μm, from about 200 μm to about 225 μm, and from about 225 μm to about 250 μm. Also included within the broad range are embodiments employing particles in ranges from about 10 μm to about 100 μm, from about 10 μm to about 200 μm, from about 20 μm to about 200 μm, from about 30 μm to about 50 μm, from about 30 μm to about 100 μm, from about 30 μm to about 200 μm, from about 30 μm to about 225 μm, from about 50 μm to about 100 μm, from about 50 μm to about 200 μm, from about 75 μm to about 150 μm, from about 75 μm to about 200 μm, from about 100 μm to about 225 μm, from about 100 μm to about 250 μm, from about 125 μm to about 225 μm, from about 125 μm to about 250 μm, from about 150 μm to about 200 μm, from about 150 μm to about 250 μm, from about 175 μm to about 250 μm, from about 200 μm to about 250 μm, from about 225 μm to about 275 μm, or from about 250 μm to about 300 μm.

Filler-particles may be incorporated into the coating compositions at various ratios depending on the binder composition and the filler-particle's properties. In some embodiments, the filler-particles may have a content range selected from about 0.01% to about 60% or more by weight. Included within that range are embodiments in which the filler-particles are present, by weight, in ranges from about 0.02% to about 0.2%, from about 0.05% to about 0.5%, from about 0.075% to about 0.75%, from about 0.1% to about 1%, from about 0.5% to about 2.5%, from about 2% to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, and greater than 60%. Also included within this broad range are embodiments in which the filler-particles are present, by weight, in ranges from about 4% to about 30%, from about 5% to about 25%, from about 5% to about 35%, from about 10% to about 25%, from about 10% to about 30%, from about 10% to about 40%, from about 10% to about 45%, from about 15% to about 25%, from about 15% to about 35%, from about 15% to about 45%, from about 20% to about 30%, from about 20% to about 35%, from about 20% to about 40%, from about 20% to about 45%, from about 20% to about 55%, from about 25% to about 40%, from about 25% to about 45%, from about 25% to about 55%, from about 30% to about 40%, from about 30% to about 45%, from about 30% to about 55%, from about 30% to about 60%, from about 35% to about 45%, from about 35% to about 50%, from about 35% to about 60%, from about 40% to about 60%, from about 0.01% to about 5%, from about 0.03% to about 1%, from about 0.05% to about 0.15%, from about 0.1% to about 2.5%, from about 0.2% to about 5%, from about 0.05% to about 10%, from about 0.1% to about 10%, from about 0.05% to about 15%, or from about 0.05% to about 20%, on a weight basis.

In one embodiment, substantially spherical thermoplastic particles are added to the binder composition to develop surface texture (EXPANCEL® microspheres). Such microspheres consist of a polymer shell encapsulating a gas. The average diameter of these hollow spheres typically ranges from 6 to 45 μm and have a density of 1000 to 1300 kg/m³ (8.3-10.8 lbs/US Gallon). Upon heating, the microspheres expand and the volume of the microspheres can increase more than 40 times (with the diameter changing, for example, from 10 to 40 μm), resulting in a density below 30 kg/m³ (0.25 lbs/US Gallon). Typical expansion temperatures range from 80° to 190° C. (176°-374° F.). When heating the microspheres the pressure of the gas inside the shell increases and the thermoplastic shell softens, resulting in a dramatic increase of the volume of the microspheres. Cooling the microspheres results in the shell stiffening again and produces lighter (lower density) expanded micro spheres.

Filler-particles may be purchased from a variety of suppliers. Some commercially available filler-particles that may be employed in the coatings described herein include those in Table 1 below.

TABLE 1

Filler-particles

| Filler-particle No. | Filler-particle ID | Filler-particle Type | Filler Particle Details | Density (g/cc) | Particle Size Range (µm) | Color | Crush Strength (psi) | Source | Location |
|---|---|---|---|---|---|---|---|---|---|
| 1 | K1 | Glass Bubbles | GPS[a] | 0.125 | 30-120 | White | 250 | 3M ™ | St. Paul, MN |
| 2 | K15 | Glass Bubbles | GPS[a] | 0.15 | 30-115 | White | 300 | 3M ™ | St. Paul, MN |
| 3 | S15 | Glass Bubbles | GPS[a] | 0.15 | 25-95 | White | 300 | 3M ™ | St. Paul, MN |
| 4 | S22 | Glass Bubbles | GPS[a] | 0.22 | 20-75 | White | 400 | 3M ™ | St. Paul, MN |
| 5 | K20 | Glass Bubbles | GPS[a] | 0.2 | 20-125 | White | 500 | 3M ™ | St. Paul, MN |
| 6 | K25 | Glass Bubbles | GPS[a] | 0.25 | 25-105 | White | 750 | 3M ™ | St. Paul, MN |
| 7 | S32 | Glass Bubbles | GPS[a] | 0.32 | 20-80 | White | 2000 | 3M ™ | St. Paul, MN |
| 8 | S35 | Glass Bubbles | GPS[a] | 0.35 | 10-85 | White | 3000 | 3M ™ | St. Paul, MN |
| 9 | K37 | Glass Bubbles | GPS[a] | 0.37 | 20-85 | White | 3000 | 3M ™ | St. Paul, MN |
| 10 | S38 | Glass Bubbles | GPS[a] | 0.38 | 15-85 | White | 4000 | 3M ™ | St. Paul, MN |
| 11 | S38HS | Glass Bubbles | GPS[a] | 0.38 | 15-85 | White | 5500 | 3M ™ | St. Paul, MN |
| 12 | K46 | Glass Bubbles | GPS[a] | 0.46 | 15-80 | White | 6000 | 3M ™ | St. Paul, MN |
| 13 | S60 | Glass Bubbles | GPS[a] | 0.6 | 15-65 | White | 10000 | 3M ™ | St. Paul, MN |
| 14 | S60/HS | Glass Bubbles | GPS[a] | 0.6 | 11-60 | White | 18000 | 3M ™ | St. Paul, MN |
| 15 | A16/500 | Glass Bubbles | Floated Series | 0.16 | 35-135 | White | 500 | 3M ™ | St. Paul, MN |
| 16 | A20/1000 | Glass Bubbles | Floated Series | 0.2 | 30-120 | White | 1000 | 3M ™ | St. Paul, MN |
| 17 | H20/1000 | Glass Bubbles | Floated Series | 0.2 | 25-110 | White | 1000 | 3M ™ | St. Paul, MN |
| 18 | D32/4500 | Glass Bubbles | Floated Series | 0.32 | 20-85 | White | 4500 | 3M ™ | St. Paul, MN |
| 19 | Expancel 551 DE 40 d42 | Plastic Microspheres | Dry Expanded | 0.042 ± 0.004 | 30-50 | | | Akzo Nobel | Dist. by Eka Chem., Inc., Duluth, GA |
| 20 | Expancel 551 DE 40 d42 ± 2 | Plastic Microspheres | Dry Expanded | 0.042 ± 0.002 | 30-50 | | | Akzo Nobel | Dist. by Eka Chem., Inc., Duluth, GA |
| 21 | Expancel 461 DE 20 d70 | Plastic Microspheres | Dry Expanded | 0.07 ± 0.006 | 15-25 | | | Akzo Nobel | Dist. by Eka Chem., Inc., Duluth, GA |
| 22 | Expancel 461 DE 40 d60 | Plastic Microspheres | Dry Expanded | 0.06 ± 0.005 | 20-40 | | | Akzo Nobel | Dist. by Eka Chem., Inc., Duluth, GA |
| 23 | Expancel 461 DET 40 d25 | Plastic Microspheres | Dry Expanded | 0.025 ± 0.003 | 35-55 | | | Akzo Nobel | Dist. by Eka Chem., Inc., Duluth, GA |
| 24 | Expancel 461 DET 80 d25 | Plastic Microspheres | Dry Expanded | 0.025 ± 0.003 | 60-90 | | | Akzo Nobel | Dist. by Eka Chem., Inc., Duluth, GA |
| 25 | Expancel 920 DE 40 d30 | Plastic Microspheres | Dry Expanded | 0.030 ± 0.003 | 35-55 | | | Akzo Nobel | Dist. by Eka Chem., Inc., Duluth, GA |
| 26 | Expancel 920 DET 40 d25 | Plastic Microspheres | Dry Expanded | 0.025 ± 0.003 | 35-55 | | | Akzo Nobel | Dist. by Eka Chem., Inc., Duluth, GA |
| 27 | Expancel 920 DE 80 d30 | Plastic Microspheres | Dry Expanded | 0.030 ± 0.003 | 55-85 | | | Akzo Nobel | Dist. by Eka Chem., Inc., Duluth, GA |
| 28 | H50/10000 EPX | Glass Bubbles | Floated Series | 0.5 | 20-60 | White | 10000 | 3M ™ | St. Paul, MN |

TABLE 1-continued

Filler-particles

| Filler-particle No. | Filler-particle ID | Filler-particle Type | Filler Particle Details | Density (g/cc) | Particle Size Range (μm) | Color | Crush Strength (psi) | Source | Location |
|---|---|---|---|---|---|---|---|---|---|
| 29 | iMK | Glass Bubbles | Floated Series | 0.6 | 8.6-26.7 | White | 28000 | 3M ™ | St. Paul, MN |
| 30 | G-3125 | Z-Light Spheres ™ | CM[b] | 0.7 | 50-125 | Gray | 2000 | 3M ™ | St. Paul, MN |
| 31 | G-3150 | Z-Light Spheres ™ | CM[b] | 0.7 | 55-145 | Gray | 2000 | 3M ™ | St. Paul, MN |
| 32 | G-3500 | Z-Light Spheres ™ | CM[b] | 0.7 | 55-220 | Gray | 2000 | 3M ™ | St. Paul, MN |
| 33 | G-600 | Zeeo-spheres ™ | CM[b] | 2.3 | 1-40 | Gray | >60000 | 3M ™ | St. Paul, MN |
| 34 | G-800 | Zeeo-spheres ™ | CM[b] | 2.2 | 2-200 | Gray | >60000 | 3M ™ | St. Paul, MN |
| 35 | G-850 | Zeeo-spheres ™ | CM[b] | 2.1 | 12-200 | Gray | >60000 | 3M ™ | St. Paul, MN |
| 36 | W-610 | Zeeo-spheres ™ | CM[b] | 2.4 | 1-40 | White | >60000 | 3M ™ | St. Paul, MN |
| 37 | SG | Extendo-sphere ™ | HS[c] | 0.72 | 30-140 | Gray | 2500 | Sphere One | Chattanooga. TN |
| 38 | DSG | Extendo-sphere ™ | HS[c] | 0.72 | 30-140 | Gray | 2500 | Sphere One | Chattanooga. TN |
| 39 | SGT | Extendo-sphere ™ | HS[c] | 0.72 | 30-160 | Gray | 2500 | Sphere One | Chattanooga TN |
| 40 | TG | Extendo-sphere ™ | HS[c] | 0.72 | 8-75 | Gray | 2500 | Sphere One | Chattanooga. TN |
| 41 | SLG | Extendo-sphere ™ | HS[c] | 0.7 | 10-149 | Off White | 3000 | Sphere One | Chattanooga. TN |
| 42 | SLT | Extendo-sphere ™ | HS[c] | 0.4 | 10-90 | Off White | 3000 | Sphere One | Chattanooga. TN |
| 43 | SL-150 | Extendo-sphere ™ | HS[c] | 0.62 | 70 | Cream | 3000 | Sphere One | Chattanooga. TN |
| 44 | SLW-150 | Extendo-sphere ™ | HS[c] | 0.68 | 8-80 | White | 3000 | Sphere One | Chattanooga. TN |
| 45 | HAT | Extendo-sphere ™ | HS[c] | 0.68 | 10-165 | Gray | 2500 | Sphere One | Chattanooga. TN |
| 46 | HT-150 | Extendo-sphere ™ | HS[c] | 0.68 | 8-85 | Gray | 3000 | Sphere One | Chattanooga. TN |
| 47 | KLS-90 | Extendo-sphere ™ | HS[c] | 0.56 | 4-05 | Light Gray | 1200 | Sphere One | Chattanooga. TN |
| 48 | KLS-125 | Extendo-sphere ™ | HS[c] | 0.56 | 4-55 | Light Gray | 1200 | Sphere One | Chattanooga. TN |
| 49 | KLS-150 | Extendo-sphere ™ | HS[c] | 0.56 | 4-55 | Light Gray | 1200 | Sphere One | Chattanooga. TN |
| 50 | KLS-300 | Extendo-sphere ™ | HS[c] | 0.56 | 4-55 | Light Gray | 1200 | Sphere One | Chattanooga. TN |
| 51 | HA-300 | Extendo-sphere ™ | HS[c] | 0.68 | 10-146 | Gray | 2500 | Sphere One | Chattanooga. TN |
| 52 | XIOM 512 | Thermoplastic | MPR[d] | 0.96 | 10-100 | White | 508 | XIOM Corp. | West Babylon, NY |
| 53 | XIOM 512 | Thermoplastic | MPR[d] | 0.96 | 10-100 | Black | 508 | XIOM Corp. | West Babylon, NY |
| 54 | CORVEL ™ Black 78-7001 | Thermoplastic | Nylon Powder Coating | 1.09 | 44-74 | Black | | ROHM & HASS | Philadelphia. PA |
| 55 | Micro-glass 3082 | Fibers | MMEGF[e] | 1.05 | 16 × 120 | White | | Fibertec | Bridgewater, MA |
| 56 | Micro-glass 9007D | Fibers Silane-Treated | MMEGF[e] | 0.53 | 10 × 150 | White | | Fibertec | Bridgewater, MA |
| 57 | Tiger Drylac Series 49 | Polyester crosslinked with TGIC (triglycidyl isocyanurate) | | | | | | | |
| 58 | SoftSand ® | Rubber based | | | 90, 180, or 300 | Various colors | | Soft-Point Indus. | Copley, OH |

[a]GPS—general purpose series
[b]ceramic microspheres
[c]hollow spheres
[d]modified polyethylene resins
[e]microglass milled E-glass filaments

2.3 Solvents

As mentioned above, the coating compositions comprise a volatile organic solvent. Examples of volatile organic solvents that can be employed for the preparation of the coating systems include, but are not limited to, methanol, ethanol, acetone, methyl ethyl ketone, methyl isobutyl ketone, ethyl acetate, butyl acetate, isobutyl acetate, tertbutyl acetate (t-butyl acetate), toluene, benzene, xylene or combinations thereof. In one embodiment, the coating composition comprises two or more, or three or more, solvents from the group consisting of: acetone, methyl ethyl ketone (MEK), and methyl isobutyl ketone (MIBK). In one embodiment, the coating composition comprises a ketone containing solvent. In other embodiments, the composition comprises acetone, methyl ethyl ketone, methyl isobutyl ketone, butylacetate, tert butyl acetate, a combination of two or more of those solvents, or a combination of three or more of those solvents. In another embodiment, the composition comprises acetone, t-butyl acetate, or a combination of those solvents.

2.3.1 VOC-Exempt Organic Compounds

In one embodiment, the solvent is a VOC-exempt compound, such as acetone. In another embodiment, the solvent comprises aromatic compounds (e.g., one or more, two or more, or all three of toluene, benzene, or xylene).

Volatile organic compounds (VOC) means any compound of carbon, excluding carbon monoxide, carbon dioxide, carbonic acid, metallic carbides or carbonates, and ammonium carbonate, which participates in atmospheric photochemical reactions. This includes any such organic compound other than the following "exempt organic compounds" or "VOC-exempt compounds," which have been determined to have negligible photochemical reactivity: methane; ethane; methylene chloride (dichloromethane); 1,1,1-trichloroethane (methyl chloroform); 1,1,2-trichloro-1,2,2-trifluoroethane (CFC-113); trichlorofluoromethane (CFC-11); dichlorodifluoromethane (CFC-12); chlorodifluoromethane (HCFC-22); trifluoromethane (HFC-23); 1,2-dichloro 1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HFC-134a); 1,1-dichloro 1-fluoroethane (HCFC-141b); 1-chloro 1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluoroethane (HFC-143a); 1,1-difluoroethane (HFC-152a); parachlorobenzotrifluoride (PCBTF); cyclic, branched, or linear completely methylated siloxanes; acetone; perchloroethylene (tetrachloroethylene); 3,3-dichloro-1,1,1,2,2-pentafluoropropane (HCFC-225ca); 1,3-dichloro-1,1,2,2,3-pentafluoropropane (HCFC-225cb); 1,1,1,2,3,4,4,5,5,5-decafluoropentane (HFC 43-10mee); difluoromethane (HFC-32); ethylfluoride (HFC-161); 1,1,1,3,3,3-hexafluoropropane (HFC-236fa); 1,1,2,2,3-pentafluoropropane (HFC-245ca); 1,1,2,3,3-pentafluoropropane (HFC-245ea); 1,1,1,2,3-pentafluoropropane (HFC-245eb); 1,1,1,3,3-pentafluoropropane (HFC-245fa); 1,1,1,2,3,3-hexafluoropropane (HFC-236ea); 1,1,1,3,3-pentafluorobutane (HFC-365mfc); chlorofluoromethane (HCFC-31); 1 chloro-1-fluoroethane (HCFC-151a); 1,2-dichloro-1,1,2-trifluoroethane (HCFC-123a); 1,1,1,2,2,3,3,4,4-nonafluoro-4-methoxy-butane ($C_4F_9OCH_3$ or HFE-7100); 2-(difluoromethoxymethyl)-1,1,1,2,3,3,3-heptafluoropropane (($CF_3$)$_2$ $CFCF_2OCH_3$); 1-ethoxy-1,1,2,2,3,3,4,4,4-nonafluorobutane ($C_4F_9OC_2H_5$ or HFE-7200); 2-(ethoxydifluoromethyl)-1,1,1,2,3,3,3-heptafluoropropane (($CF_3$)$_2$ $CFCF_2OC_2H_5$); methyl acetate; 1,1,1,2,2,3,3-heptafluoro-3-methoxy-propane (n-$C_3F_7OCH_3$, HFE-7000), 3-ethoxy-1,1,1,2,3,4,4,5,5,6,6,6-dodecafluoro-2-(trifluoromethyl) hexane (HFE-7500), 1,1,1,2,3,3,3-heptafluoropropane (HFC-227ea), methyl formate ($HCOOCH_3$); (1) 1,1,1,2,2,3,4,5,5,5-decafluoro-3-methoxy-4-trifluoromethyl-pentane (HFE-7300); propylene carbonate; dimethyl carbonate; t-butyl acetate; and perfluorocarbon compounds which fall into these classes:

(i) cyclic, branched, or linear, completely fluorinated alkanes;

(ii) cyclic, branched, or linear, completely fluorinated ethers with no unsaturations;

(iii) cyclic, branched, or linear, completely fluorinated tertiary amines with no unsaturations; and (iv) sulfur containing perfluorocarbons with no unsaturations and with sulfur bonds only to carbon and fluorine.

2.4 Coating Properties

Embodiments of the coatings disclosed herein, once dried and cured, can have a variety of characteristics in addition to displaying hydrophobic and/or oleophobic behavior.

The coatings display a defined range of hardness that may be evaluated by any known method in the art. In one embodiment, the test employed for hardness is the ASTM D3363-05 (2011)e2 Standard Test Method for Film Hardness by Pencil Test. In some embodiments, depending on the polymer composition employed and/or any non-acrylic polymers that may be combined with the acrylic polymers in the composition, the coatings will display a hardness of 9B or 8B using that hardness scale. In some embodiments, the coatings produced may have a hardness of about 7B, 6B or 5B. Accordingly, in some embodiments the coatings produced may have a hardness from about 9B to about 8B, 9B to about 7B, 9B to about 6B, 9B to about 5B, from about 8B to about 7B, from 8B to about 6B, from about 8B to about 5B, from about 7B to about 6B, 7B to about 5B, or from about 6B to about 5B.

The coatings described herein may also have a defined durability in that they can withstand some amount of abrasion without a substantial loss of HP/OP properties. The durability of the hydrophobicity and/or oleophobicity can range from resistance to moderate contact to resistance to abrasion that does not damage the surface by pealing, chipping, or marring the binder. Resistance to abrasion may be measured using any method known in the art including, but not limited to, assessment with a Taber abrasion-testing instrument (e.g., a Taber "Abraser") or a Crockmeter.

For the purpose of this application, wherever Taber testing results are recited, the tests are conducted on a Taber Model 503 instrument using CS-0 or CS10 wheels with 250 g or 1,000 g loads as indicated.

Abrasion may also be measured using other instruments such as an AATCC Crockmeter, which may be motorized or operated manually, or by manual semiquantitative "glove rub" testing. For the purpose of this application, wherever testing is conducted using a Crockmeter it is performed using a motorized CM-5 Crockmeter with a 14/20 white rubber septum fitted on the instrument's finger to contact the coating (Ace Glass, Inc., Vineland, N.J., Catalog No. 9096-244). Tests are conducted at about 20° C. using a 9 Newton load.

The coating compositions, once dried and cured, have hydrophobic and/or oleophobic properties. In addition, they display chemical resistance to a variety of alcohols and/or hydrocarbons. Embodiments of the dried and cured coatings are may be stable when exposed to compositions with a pH from about 2.0 to about 10.0, about 2.0 to about 6.0, about 5.0 to about 9.0, or about 8.0 to about 10.0.

3.0 COATING APPLICATION METHOD

The coatings described herein can be applied to surfaces using any means known in the art including, but not limited to, brushing, painting, printing, stamping, rolling, dipping, spin-coating, spraying, or electrostatic spraying.

In one embodiment, the coating compositions described herein are prepackaged in a delivery system/apparatus for spray applications, such as aerosol canisters (e.g., pre-pressurized aerosol cans). In such an embodiment, a propellant may be added to the system/apparatus that serves to drive the components out of their canisters for delivery. Propellants will typically be a gas at 25° C. and 1 atmosphere, but may be in a different phase (liquid) under pressure, such as in a pressurized aerosol delivery system.

In one embodiment, propellants are a gas or combination of gases (e.g., air, nitrogen, carbon dioxide). In another embodiment, propellants are a liquefiable gas having a vapor pressure sufficient to propel and aerosolize the coating composition as it exits the delivery system/apparatus). Some propellants include: liquefied petroleum gases, ethers (e.g., dimethyl ether (DME), diethyl ether and combinations thereof); $C_1$-$C_4$ saturated hydrocarbons (e.g., methane, ethane, propane, n-butane, and isobutane); hydrofluorocarbons (HFC) (e.g., 1,1,1,2 tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a)), nitrous oxide, carbon dioxide, and mixtures comprising any two, three or more of the foregoing. In another embodiment, the propellant is a blend of n-butane and propane.

In one embodiment, the propellant is a blend of isobutante, n-butane and propane. In another embodiment, the propellant is nitrous oxide and/or carbon dioxide. In another embodiment, the propellant comprises hydrofluoroalkanes (HFA) (e.g., HFA-134a (1,1,1,2,-tetrafluoroethane) or HFA-227 (1,1,1,2,3,3,3-heptafluoropropane) or combinations of the two). In some embodiments, the propellants may be comprised of greater than 30, 40, 50, 60, 70, 80 or 90 percent of one, two, three, or more VOC-exempt compounds by weight of the propellant.

The coatings described herein can be applied to virtually any substrate to provide hydrophobic and/or oleophobic properties. Generally, the surfaces to be coated will be rigid or semi-rigid, but the surfaces can also be flexible, for example in the instance of wires, tapes, rubberized materials, gaskets, and ribbons. The coating compositions may be employed in a variety of applications in which it would be advantageous to provide a rigid, semi-rigid and/or flexible surface with hydrophobic and/or oleophobic properties, for example to coat components used in electronic devices and/or circuitry/circuit boards to render them resistant to water and other aqueous compositions.

The choice of coatings and coating process that will be used may be affected by the compatibility of the substrate and its surface to the coating process and the components of the coating compositions. Among the considerations are the compatibility of the substrate and its surface with any solvents that may be employed in the application of the coatings and the ability of a desired coating to adhere to the substrate's surface.

Coatings may take any desired shape or form, limited only by the manner and patterns in which they can be applied. In some embodiments, the coating will completely cover a surface. In other embodiments, the coating will cover only a portion of a surface, such as one or more of a top, side or bottom of an object. In one embodiment, a coating is applied as a line or strip on a substantially flat or planar surface. In such an embodiment, the line or strip may form a spill-resistant border.

The shape, dimensions and placement of coatings on surfaces can be controlled by a variety of means including the use of masks, which can control not only the portions of a surface that will receive a coating, but also the portions of a surface that may receive prior treatments such as the application of a primer layer or cleaning by abrasion or solvents. For example, where sandblasting or a chemical treatment is used to prepare a portion of a surface for coating, a mask resistant to those treatments would be selected (e.g., a mask such as a rigid or flexible plastic, resin, or rubber/rubberized material). Masking may be attached to the surface through the use of adhesives, which may be applied to the mask agent, the surface, or both.

In another embodiment, coatings are applied to a ribbon, tape or sheet that may then be applied to a substrate by any suitable means including adhesive applied to the substrate, the ribbon or tape, or both. Ribbons, tapes and sheets bearing a hydrophobic coating may be employed in a variety of applications, including forming spill-proof barriers on surfaces. Ribbons, tapes, and sheets are generally formed of a substantially flat (planar) flexible material where one side (the top) is made hydrophobic. This includes metal sheets, ribbons, and tapes such as aluminum tape or other tapes (e.g., metal adhesive tape, plastic adhesive tape, paper adhesive tape, fiberglass adhesive tape), wherein one side is coated with the coatings described herein and adhesive is applied to the other side. Once such ribbons, tapes, and sheets are prepared, they can be applied to any type of surface including metal, ceramic, glass, plastic, or wood, for a variety of purposes.

In one embodiment, the coatings are applied to a surface by spraying in a method comprising:

(a) spraying a coating composition on all or part of a surface; and (b) optionally applying additional layers of the coating composition to all or part of the surface to which one or more previous layers of coating composition were applied. In one embodiment, such spray applications are conducted employing the coating composition packaged in aerosol spray canisters to which a propellant has been added.

4.0 CERTAIN EMBODIMENTS

Table 2 and the list of embodiments that follows it provide a series of non-limiting embodiments directed to the coatings and methods described herein. Table 2 lists a series of compositions comprising an acrylic binder, solvent, and nano-particles that are covalently or non-covalently associated with chemical groups that give rise to hydrophobic and/or oleophobic properties (e.g., nano-particles treated with a silanizing agent or nano-particles treated with polydimethylsiloxane). Each potential composition set forth by selecting an acrylic binder, its percentage composition, the type of nano-particle and its percentage composition, and the solvent from the columns in Table 2 is disclosed as if recited separately.

TABLE 2

| Series | Acrylic Binder Comprises | % Binder weight/volume of final composition | Nano-particle | % Nano-particle weight/volume of final composition | Solvent Comprises: |
|---|---|---|---|---|---|
| 1 | MMA Polymer or copolymer; BMA Polymer or copolymer; EMA Polymer or copolymer; MMA/BMA copolymer; MMA/EMA copolymer; or a BMA/EMA copolymer | 0.4%--10%, 0.5%-9%, 0.6%-8%, 0.7%-7%, 0.8%-6%, 1%-5.5%, 2%-5%, 2.1%-4.0%, 4.1%-6.0%, or 6.1-8.0% | Fumed silica, TiO2, or Alumina treated with polydimethyl-siloxane or a silanizing agent (e.g., M5 fumed silica treated with (tridecafluoro-1,1,2,2-tetrahydrooctyl) trichlorosilane) | 0.1%-10%, 0.2%-7.5%, 0.5%-6%, 0.8%-5%, or 1%-4% w/v | Acetone, Acetone/tertbutyl-acetate Acetone/Ethanol, Acetone/MEK, Acetone/MIKB, Aromatic solvent(s) |
| 2 | MMA Polymer or MMA Co-polymer | 0.4%-10% 0.5%-9%, 0.6%-8%, 0.7%-7%, 0.8%-6%, 1%-5.5%, 2%-5%, 2.1%-4.0%, 4.1%-6.0%, or 6.1-8.0% | Fumed silica, TiO2, or Alumina treated with polydimethyl-siloxane or a silanizing agent (e.g., M5 fumed silica treated with (tridecafluoro-1,1,2,2-tetrahydrooctyl) trichlorosilane) | 0.1%-10%, 0.2%-7.5%, 0.5%-6%, 0.8%-5%, or 1%-4% w/v | Acetone, Acetone/tertbutyl-acetate Acetone/Ethanol, Acetone/MEK, Acetone/MIKB, Aromatic solvent(s) |
| 3 | MMA and BMA copolymer | 0.4%-10%, 0.5%-9%, 0.6%-8%, 0.7%-7%, 0.8%-6%, 1%-5.5%, 2%-5%, 2.1%-4.0%, 4.1%-6.0%, or 6.1-8.0% | Fumed silica, TiO2, or Alumina treated with polydimethyl-siloxane or a silanizing agent (e.g., M5 fumed silica treated with (tridecafluoro-1,1,2,2-tetrahydrooctyl) trichlorosilane) | 0.1%-10%, 0.2%-7.5%, 0.5%-6%, 0.8%-5%, or 1%-4% w/v | Acetone, Acetone/tertbutyl-acetate Acetone/Ethanol, Acetone/MEK, Acetone/MIKB, Aromatic solvent(s) |
| 4 | EMA copolymer | 0.4%-10% 0.5%-9%, 0.6%-8%, 0.7%-7%, 0.8%-6.%, 1%-5.5%, 2%-5%, 2.1%-4.0%, 4.1%-6.0%, or 6.1-8.0% | Fumed silica, TiO2, or Alumina treated with polydimethyl-siloxane or a silanizing agent (e.g., M5 fumed silica treated with (tridecafluoro-1,1,2,2-tetrahydrooctyl) trichlorosilane) | 0.1%-10%, 0.2%-7.5%, 0.5%-6% 0.8%-5% or 1%-4% w/v | Acetone, Acetone/tertbutyl-acetate Acetone/Ethanol, Acetone/MEK, Acetone/MIKB, Aromatic solvent(s) |

4.1 List of Embodiment

1. A composition for coating surfaces and objects giving rise to a hydrophobic coating comprising: an acrylic binder, nano-particles from about 8 nm to about 100 nm associated covalently or non-covalently with a hydrocarbon or fluorohydrocarbon containing group (alkyl or fluoroalkyl group), and a solvent.
2. The composition of embodiment 1, wherein the nano-particles comprise silica, fumed silica, titanium dioxide or alumina.
3. The composition according to embodiments 1 or 2, wherein the solvent comprises a VOC-exempt compound selected from acetone, t-butylacetate and/or combinations thereof.
4. The composition of any of embodiments 1-3, wherein the nano-particles are treated with a polydimethylsiloxane, a silanizing agent, or a combination thereof.
5. The compositions of any of embodiments 1-4, wherein the composition is rapid drying as defined herein. That is, wherein when the composition is applied in an amount of about 2.5 square meters/liter on a substantially planar aluminum test plate that is held substantially constant at a temperature of approximately 23° C., such application being divided into a series of five sprays, each such spray comprising about one-fifth of the total composition, the composition produces within sixty seconds following each spray a coating that does not transfer to or stick to a surface brought in contact with the coated area, wherein the drying of the spray is not accelerated by heating or forced air circulation, provided that the solvent in the composition can freely evaporate.
6. The composition of any of embodiments 1-5, wherein the composition dries to a hydrophobic and/or oleophobic coating that resists a loss in hydrophobicity when subject to abrasion greater than 2 cycles using a Taber Abraser equipped with CS10 wheels under a 250 g load and operated at 95 RPM at about 20° C. in less than about one hour, 30 minutes, 20 minutes, 10 minutes, or 5 minutes.
7. An apparatus comprising a composition of any of embodiments 1-6.
8. The apparatus of embodiment 7, wherein said apparatus produces an aerosol or spray of said composition for spray application of said coating.
9. The apparatus of embodiment 7 or 8, wherein said apparatus comprises a spray can or a canister containing said composition.

10. The apparatus of embodiment 8 or embodiment 9 wherein said apparatus further comprises a propellant, which may be contained with the coating composition in the can or canister of embodiment 9.
11. The apparatus of embodiment 10, wherein said propellant is carbon dioxide, pressurized air or nitrogen.
12. A coating prepared by applying said composition of any of embodiments 1-5.
13. A coating applied by applying said composition with an apparatus of any of embodiments 7-12.
14. A method of coating a surface, or a portion thereof, comprising applying a composition of any of embodiments 1-6.
15. A method of coating a surface, or a portion thereof, comprising applying an aerosol or spray of said composition using an apparatus according to any of embodiments 7-11.
16. A composition for preparing a hydrophobic and/or oleophobic coating according to any of claims 1-6, comprising an acrylic binder as set forth in Table 2.
17. The composition of embodiment 16, wherein the acrylic binder comprises: a MMA polymer or copolymer; BMA polymer or copolymer; EMA polymer or copolymer; MMA/BMA copolymer; MMA/EMA copolymer; or a BMA/EMA copolymer.
18. The composition of embodiment 16, wherein the acrylic binder comprises a MMA polymer and/or MMA copolymer.
19. The composition of embodiment 16, wherein the acrylic binder comprises a BMA polymer and/or BMA copolymer.
20. The composition of embodiment 16, wherein the acrylic binder comprises an EMA copolymer.
21. A coating prepared by the application of a composition according to any of embodiments 16-20 to a surface.
22. A method of preparing a hydrophobic and/or oleophobic coating or surface comprising applying a composition according to any of embodiments 16-20 to the surface of an object or a part of a surface of an object.
23. A coating according to any of embodiments 12, 13 or 21 having a hardness of at least 9B using the ASTM D3363-05(2011)e2 Standard Test Method for Film Hardness by Pencil Test.
24. A coating according to any of embodiments 12, 13 or 21 wherein the coating provides superhydrophobic properties.
25. A coating according to any of embodiments 12, 13 or 21 wherein the coating provides hydrophobic but not superhydrophobic properties.
26. A coating according to any of embodiments 12, 13, 21 or 23-25 that is superhydrophobic and retains its superhydrophobicity for at least 5 cycles (revolutions) of a Taber Abraser using CS10 wheels with a 250 g load at 95 rpm at about 20° C. and/or 14 strokes on a Crockmeter using a 14/20 white rubber septum fitted on to the Crockmeter to contact the coating (Catalog No. 9096-244, Ace Glass, Inc., Vineland, N.J.) at about 20° C., at a 9 Newton load; loss of superhydrophobic behavior is deemed to be the point at which more than half of the water droplets applied to a substantially planar test surface subject to the action of said CS10 wheels (typically 20 droplets are applied) fails to run (roll) off when the surface is inclined at 5 degrees from horizontal.
27. A composition according to any of embodiments 1-6 or 16-20, wherein said composition further comprises filler-particles.
28. A coating according any of embodiments 12, 13, 21, or 23-26, further comprising filler-particles.

5.0 EXAMPLES

Example 1

One example of the coating composition described herein comprises:
(i) 2% to 4% by weight fumed silica (M5 fumed silica, Cabot Corp.) treated with tridecafluoro-1,1,2,2-tetrahydrooctyl) trichlorosilane;
(ii) 5% acrylic polymer (e.g., MMA polymer or copolymer, or a MMA/BMA copolymer) w/v based on the total volume of the composition;
(iii) 91% to 93% acetone or acetone/ethanol as a solvent.

The coating composition can be sprayed via gravity, spray gun, or aerosol spray can. It also can be applied by dipping an object into the mixture. Where it is to be applied by spray can, it is introduced into the can with a compatible propellant.

The sample was tested for wear resistance using three tests.

Example 2

The formulation of Example 1 is applied via aerosol spray can by:
1. cleaning and drying a target surface to be coated as needed before applying the coating;
2. agitating the composition (e.g., shaking the spray can) for at least 2 minutes, or as needed, before using;
3. spraying the coating composition on to the surface (e.g., at a distance of approximately 12 inches from target; starting with 3-4 light coats. Stop and wait for the coating to dry if the target appears to become "damp"); and
4. following 3, optionally applying additional amounts of the coating composition on to the surface by spraying 1-2 light coat(s) of the composition on the surface every 30 seconds (or more) until a desired thickness is achieved.

Typically steps 3-4 are repeated to apply 5-6 coats and produce a coating that is effective. The application of 7-10 coats will yield a product with higher hydrophobicity and that is more durable. The coating can be applied until desire thickness or "whiteness" from the silica is achieved.
5. Drying the coating for 0-20 minutes (min.), 0.5-5 min., 5-10 min., 10-15 min., 15-20 min., or 0.5-15 min., before use or handling. The coating is typically dried for 0.5-15 minutes before the product is used or handled.

When applied by spray gun, the mixture requires 3 coats applied one after another to yield a surface that has hydrophobic and/or oleophobic characteristics. A dry time of about 15 minutes at room temperature without forced air circulation is generally employed prior to handling and wetting even though each application is dry to the touch after as little as 30 seconds to 2 minutes.

When the coating is applied by dipping, the coating composition should have a higher concentration of the treated silica. In dipping, the object is immersed into the mixture and removed to drip dry. Excess coating composition is often removed by shaking. Drying is conducted at room temperature.

Example 3

Coating Tests

Cleaned substantially planar aluminum plates (about 10.2 cm X 10.2 cm squares 1.5 mm thick) are coated with a composition comprising PARALOID™ B-64 as the MMA/BMA copolymer prepared as described in Example 1, with the exception that 0.1% w/v filler is added. The composition is applied by spraying multiple applications of the composition on the surface of the plate to build up having a final thickness of about 12.7 to about 25.4 microns (about 0.5 to about 1 mil thickness). After drying for at least an hour, the aluminum plates are subject to a durability test to determine the point at which the coating loses superhydrophobic behavior by Taber Abraser measurement or by measurement using a Crockmeter.

Where loss of superhydrophobic behavior is determined using Taber Abraser testing, the Abraser is equipped with CS-10 (abrasive) wheels with 250 gram load. Tests are conducted at 95 rpm at a speed of 95 rpm. The end of superhydrophobic behavior is judged by the failure of more than half of the water droplets applied to the tested surface (typically 20) to run (roll) off when the surface is inclined at 5 degrees from horizontal.

Loss of superhydrophobic behavior can also be determined using an American Association of Textile Chemists and Colorists (AATCC) CM-5 Crockmeter. Superhydrophobic behavior is judged before and after the surface is subject to the action of a cylindrical 14/20 white rubber septum (Part No. 9096-244, Ace Glass, Inc., Vineland, N.J., having an outside diameter of 13 mm and an inside diameter of 7 mm, contact surface area of 94 $mm^2$) fitted on the finger of the Crockmeter. The septum is rubbed across the surface using a motorized CM-5 Crockmeter applying a 9 Newton load. The end of superhydrophobic behavior is judged by the failure of more half of the water droplets applied to the tested surface (typically 20) to run (roll) off when the surface is inclined at 5 degrees from horizontal.

Figure 1:
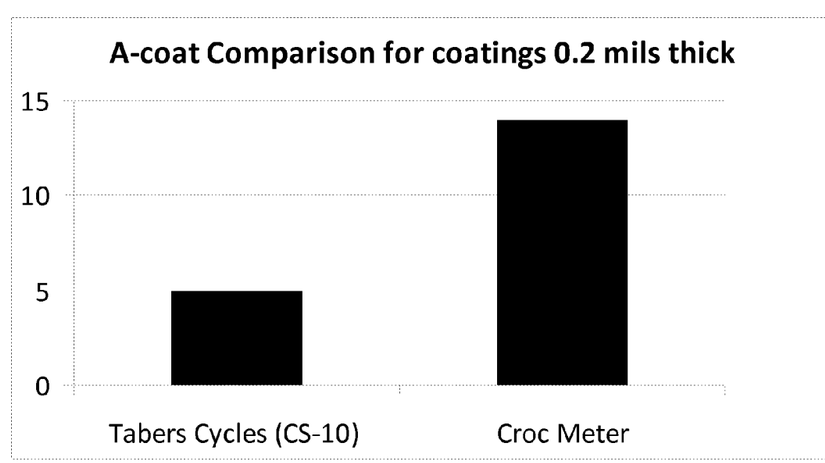
FIG. 1 shows data from the testing of an embodiment of an acrylic polymer coating described herein.

The results of Taber Abraser testing and Crockmeter testing are shown in FIG. 1.

Coating hardness is determined using ASTM D3363-05 (2011)e2 Standard Test Method for Film Hardness by Pencil Test. The coating achieves a hardness of 9B or greater.

The invention claimed is:

1. A coating composition giving rise to a hydrophobic coating, the coating composition comprising: an acrylic binder, nano-particles from about 8 nm to about 100 nm associated covalently or non-covalently with alkyl or fluoroalkyl groups, and a solvent, where the solvent comprises a compound selected from the group consisting of acetone, t-butylacetate and/or combinations thereof;
   wherein the acrylic binder comprises: a MMA polymer or copolymer; a BMA polymer or copolymer; an EMA polymer or copolymer; a MMA/BMA copolymer; a MMA/EMA copolymer; or a BMA/EMA copolymer; and
   wherein when the composition is applied at a rate of 1 liter per 2.5 square meters, such application being divided into a series of five spray applications, each such spray application comprising one-fifth (0.2 liters) of the total composition, the composition dries within sixty seconds following each spray to form a coating that does not transfer to, or stick to, a surface brought in contact with the hydrophobic coating, if the solvent in the composition is allowed to freely evaporate in the absence of heating or forced air circulation.

2. The composition of claim 1, wherein the nano-particles comprise silica, fumed silica, titanium dioxide or alumina.

3. The composition of claim 2, wherein the nano-particles are treated with a polydimethylsiloxane, a silanizing agent, or a combination thereof.

4. The composition of claim 1, wherein the composition provides a hydrophobic and/or oleophobic coating that resists a loss in hydrophobicity when subject to abrasion greater than 2 cycles using a Taber Abraser equipped with CS10 wheels under a 250 g load and operated at 95 RPM at about 20° C. in less than about one hour.

5. A spray coating apparatus comprising a can or canister containing a composition of claim 1, wherein said apparatus produces an aerosol or spray of said composition for spray application of said coating.

6. A hydrophobic coating prepared by applying the composition of claim 1 to all or part of the surface of an object.

7. A method of coating a surface, or a portion thereof, comprising applying a composition of claim 1.

8. A method of coating a surface, or a portion thereof, comprising applying an aerosol or spray of said composition with an apparatus according to claim 5.

9. The composition of claim 1, wherein the acrylic binder comprises a MMA polymer and/or MMA copolymer.

10. The composition of claim 1, wherein the acrylic binder comprises a MMA polymer and/or BMA copolymer.

11. The composition of claim 1, wherein the acrylic binder comprises an EMA copolymer.

12. A hydrophobic coating prepared by the application of a composition according to claim 1 to all or part of the surface of an object, wherein the coating is also oleophobic.

13. A method of preparing a hydrophobic and/or oleophobic coating or surface, comprising applying a composition according to claim 1 to the surface of an object or a part of the surface of an object.

14. A coating according to claim 6, wherein the coating is superhydrophobic.

15. A coating according to claim 14, wherein said coating has a hardness of at least 9B using the ASTM D3363-05 (2011)e2 Standard Test Method for Film Hardness by Pencil Test.

16. A coating according to claim 15, that retains its superhydrophobicity for at least 2 cycles (revolutions) of a Taber Abraser using CS10 wheels with a 250 g load at 95 rpm at about 20° C. and/or 14 strokes on a Crockmeter operated with a 9 Newton load at about 20° C., where loss of superhydrophobic behavior is deemed to be the point at which more than half of the water droplets applied to a substantially planar test surface run off when the surface is inclined at 5 degrees from horizontal.

17. A coating according to claim 12, wherein the coating is superhydrophobic.

18. A coating according to claim 12, wherein said coating has a hardness of at least 9B using the ASTM D3363-05 (2011)e2 Standard Test Method for Film Hardness by Pencil Test.

19. A coating according to claim 1, wherein said coating has a hardness of at least 9B using the ASTM D3363-05 (2011)e2 Standard Test Method for Film Hardness by Pencil Test.

20. The coating of claim 6, wherein said nano-particles comprise fumed silica, fumed alumina or fumed $TiO_2$ covalently bound to the alkyl or fluoroalkyl groups and said object is an electronic device, electronic circuitry or a circuit board.

21. The coating of claim 12, wherein said nano-particles comprise fumed silica, fumed alumina or fumed $TiO_2$ covalently bound to the alkyl or fluoroalkyl groups and said object is an electronic device, electronic circuitry or a circuit board.

22. The coating of claim 14, wherein said nano-particles comprise fumed silica, fumed alumina or fumed $TiO_2$ covalently bound to the alkyl or fluoroalkyl groups and said object is an electronic device, electronic circuitry or a circuit board.

* * * * *